US012394378B2

(12) United States Patent
Zhang

(10) Patent No.: US 12,394,378 B2
(45) Date of Patent: Aug. 19, 2025

(54) DISPLAY PANEL, DRIVING METHOD THEREOF AND DISPLAY DEVICE

(71) Applicants: Wuhan Tianma Microelectronics Co., Ltd., Wuhan (CN); Wuhan Tianma Microelectronics Co., Ltd. Shanghai Branch, Shanghai (CN)

(72) Inventor: Mengmeng Zhang, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/632,727

(22) Filed: Apr. 11, 2024

(65) Prior Publication Data

US 2024/0257753 A1 Aug. 1, 2024

(30) Foreign Application Priority Data

Apr. 13, 2023 (CN) ......................... 202310420062.7

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/0286* (2013.01); *G09G 2310/08* (2013.01); *G09G 2320/0233* (2013.01)

(58) Field of Classification Search
None
See application file for complete search history.

(56) References Cited

U.S. PATENT DOCUMENTS

| | | | | |
|---|---|---|---|---|
| 11,468,839 | B2 * | 10/2022 | Sang | G09G 3/3233 |
| 2021/0020109 | A1 * | 1/2021 | Lin | H10K 59/1213 |
| 2021/0027696 | A1 * | 1/2021 | Kim | G09G 3/3233 |
| 2023/0098040 | A1 * | 3/2023 | Zhou | G09G 3/3233 345/55 |
| 2023/0146078 | A1 * | 5/2023 | Huang | G09G 3/3266 345/55 |
| 2023/0260451 | A1 * | 8/2023 | Kim | G09G 3/3233 345/82 |
| 2024/0087533 | A1 * | 3/2024 | Li | G09G 3/2003 |

* cited by examiner

*Primary Examiner* — Dorothy Harris
(74) *Attorney, Agent, or Firm* — KDW FIRM PLLC

(57) ABSTRACT

A display panel includes multiple rows of pixel circuits. A pixel circuit includes a drive module, a light emission module, a data write module and a threshold compensation module. A method for driving a display panel includes: within a display frame, controlling threshold compensation modules in at least two rows of pixel circuits to be in the conduction state within the preset time interval; within the preset time interval, controlling data write modules in the at least two rows of pixel circuits to be successively turned on, and in the at least two rows of pixel circuits, controlling the conduction duration of data write modules in the previous row of pixel circuits to be less than the conduction duration of data write modules in the next row of pixel circuits.

20 Claims, 10 Drawing Sheets

--Prior Art--

--Prior Art--

DISPLAY PANEL, DRIVING METHOD THEREOF AND DISPLAY DEVICE

CROSS-REFERENCE TO RELATED APPLICATION

This application claims priority to Chinese Patent Application No. 202310420062.7 filed Apr. 13, 2023, the disclosure of which is incorporated herein by reference in its entirety.

TECHNICAL FIELD

Embodiments of the present disclosure relate to the field of display technologies and, in particular, to a display panel, a driving method thereof and a display device.

BACKGROUND

With the constant development of display technologies, people have increasingly higher requirements for the performance of a display panel. The display plane includes multiple rows of pixel circuits that are used for driving corresponding light-emitting devices to emit light. At present, there is a relatively large brightness difference between light-emitting devices driven by different pixel circuits in the existing display panel, which causes a relatively poor brightness uniformity of the display panel.

SUMMARY

Embodiments of the present disclosure provide a display panel, a driving method thereof and a display device to reduce the brightness difference between light emission modules driven by multiple rows of pixel circuits so that the brightness uniformity of the display panel can be improved, and the design of the narrow bezel can be implemented.

In an aspect, embodiments of the present disclosure provide a method for driving a display panel. The display panel includes a plurality of rows of pixel circuits, and a pixel circuit of the plurality of rows of pixel circuits includes a drive module, a light emission module, a data write module and a threshold compensation module. The drive module is configured to drive the light emission module to emit light, the data write module is connected between a data voltage terminal and a first terminal of the drive module and is configured to write a data voltage into the drive module, and the threshold compensation module is connected between a second terminal of the drive module and a control terminal of the drive module and is configured to compensate for a threshold voltage of the drive module.

The method for driving a display panel includes: within a display frame, controlling threshold compensation modules in at least two rows of pixel circuits of the plurality of rows of pixel circuits to be in a conduction state within a preset time interval, and within the preset time interval, controlling data write modules in the at least two rows of pixel circuits to be successively turned on, and in the at least two rows of pixel circuits, controlling a conduction duration of data write modules in a previous row of pixel circuits to be less than a conduction duration of data write modules in a next row of pixel circuits.

In another aspect, embodiments of the present disclosure provide a display panel driven by the method for driving a display panel described above. The display panel includes a plurality of rows of pixel circuits, and a pixel circuit of the plurality of rows of pixel circuits includes a drive module, a light emission module, a data write module and a threshold compensation module. The drive module is configured to drive the light emission module to emit light according to a voltage of a control terminal of the drive module. The data write module is connected between a data voltage terminal and a first terminal of the drive module and is configured to write a data voltage into the drive module. The threshold compensation module is connected between a second terminal of the drive module and the control terminal of the drive module and is configured to compensate for a threshold voltage of the drive module.

In another aspect, embodiments of the present disclosure provide a display device including the display panel described above.

It is to be understood that the content described in this section is neither intended to identify key or critical features of embodiments of the present disclosure nor intended to limit the scope of the present disclosure. Other features of the present disclosure become easily understood through the description hereinafter.

BRIEF DESCRIPTION OF DRAWINGS

To illustrate the technical solutions in embodiments of the present disclosure more clearly, drawings used in the description of the embodiments are briefly described below. Apparently, the drawings described below only illustrate part of the embodiments of the present disclosure, and those of ordinary skill in the art may obtain other drawings based on the drawings on the premise that no creative work is done.

DETAILED DESCRIPTION

Figure 1:
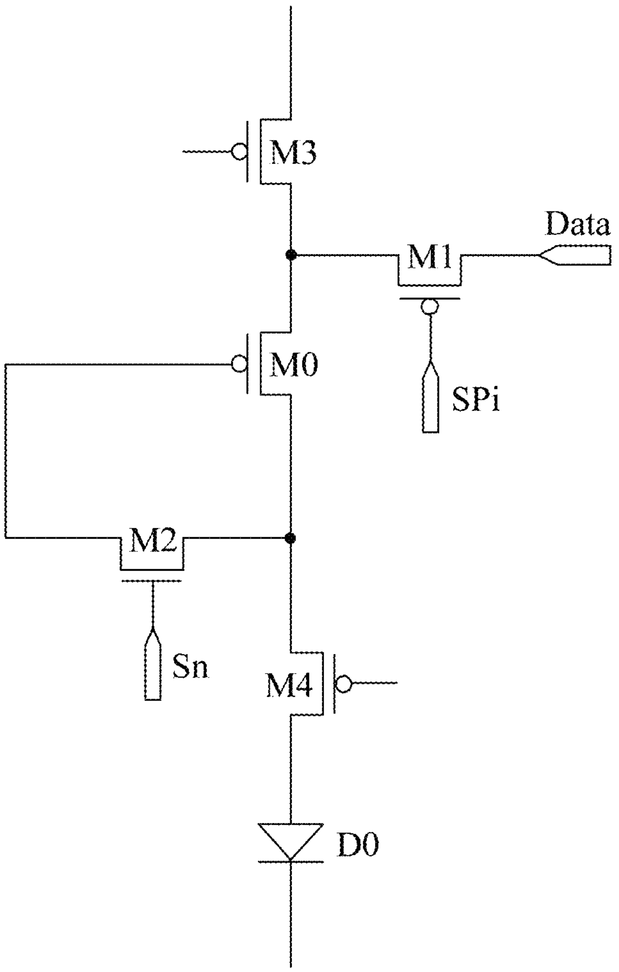
FIG. 1 is a diagram illustrating the structure of a pixel circuit in the related art.

The technical solutions in embodiments of the present disclosure are described clearly and completely in conjunction with drawings in the embodiments of the present disclosure from which the solutions of the present disclosure are better understood by those skilled in the art. Apparently, the embodiments described below are part, not all, of the embodiments of the present disclosure. Based on the embodiments of the present disclosure, all other embodiments obtained by those of ordinary skill in the art on the premise that no creative work is done are within the scope of the present disclosure.

It is to be noted that terms such as "first" and "second" in the description, claims and drawings of the present disclosure are used for distinguishing between similar objects and are not necessarily used for describing a particular order or sequence. It is to be understood that the data used in this manner are interchangeable in appropriate cases so that the embodiments of the present disclosure described herein can be implemented in an order not illustrated or described herein. Additionally, the terms "including", "having" and variations thereof are intended to encompass a non-exclusive inclusion. For example, a process, method, system, product, or device that includes a series of steps or units not only includes the expressly listed steps or units but may also include other steps or units that are not expressly listed or are inherent to such process, method, product, or device.

It is apparent to those skilled in the art that various modifications and variations in the present disclosure may be made without departing from the spirit or scope of the present disclosure. Therefore, the present disclosure is intended to cover modifications and variations of the present disclosure that fall within the scope of the corresponding claims (the claimed technical solutions) and their equivalents. It is to be noted that the embodiments of the present disclosure, if not in collision, may be combined with each other.

As described in the background, there is a relatively large brightness difference between light-emitting devices driven by different pixel circuits in the existing display panel, which causes a relatively poor brightness uniformity of the display panel. Through research, the reason for the preceding problem is found, and the reason is specifically described below.

In the low-frequency display application of the display panel, a hybrid thin film transistor (TFT) display (HTD) pixel circuit design is used, that is, in the pixel circuit of the pixel circuit, a part of transistors are low-temperature polycrystalline silicon (LTPS) transistors, and a part of the transistors are indium gallium zinc oxide (IGZO) transistors. Compared with the pixel circuit in which only low-temperature polycrystalline silicon transistors are disposed in the related art, such pixel circuit requires to be controlled by multiple groups of scan signals, so multiple groups of shift register circuits require to be added in the display panel accordingly, resulting in the relatively large bezel of the display panel. To reduce the bezel area of the display panel, one shift register circuit is generally used for supplying a scan signal to multiple rows of pixel circuits to drive the multiple rows of pixel circuits through one shift register circuit, that is, to implement the design in which one shift register circuit drives multiple rows of pixel circuits, for example, the design in which one shift register circuit drives two rows of pixel circuits, so that the number of shift register circuits in the display panel can be reduced, and thereby the bezel area occupied by the shift register circuits can be reduced.

Figure 2:
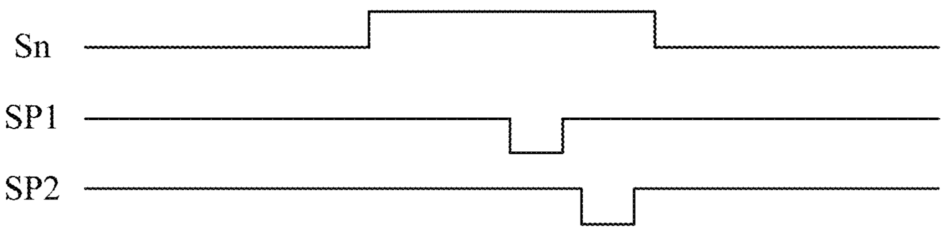
FIG. 2 is a drive timing diagram of the pixel circuit in FIG. 1.

FIG. 1 is a diagram illustrating the structure of a pixel circuit in the related art, and FIG. 2 is a drive timing diagram of the pixel circuit in FIG. 1. Using FIGS. 1 and 2 for example, the pixel circuit includes a drive transistor M0, a first transistor M1, a second transistor M2, a third transistor M3, a fourth transistor M4 and a light-emitting element DO. The gate of the first transistor M1 is connected to a scan signal SPi, and the gate of the second transistor M2 is connected to a scan signal Sn. In the design in which one shift register circuit drives two rows of pixel circuits, the two rows of pixel circuits are connected to the same one scan signal Sn and different scan signals SPi. For ease of distinguishing, the scan signals SPi connected to the two rows of pixel circuits are denoted as SP1 and SP2. After second transistors M2 in the two rows of pixel circuits are turned on in response to a high level in the scan signal Sn, first transistors M1 in one (which is denoted as the first row) of the two rows of pixel circuits are first turned on in response to a low level in the scan signal SP1 so that a data voltage Data can be written into the gates of drive transistors M0 through first transistors M1, the drive transistors M0 and second transistors M2 of the first row of pixel circuits successively and simultaneously compensate for threshold voltages of the drive transistors M0; and first transistors M1 in the other one (which is denoted as the second row) of the two rows of pixel circuits are turned on in response to a low level in the scan signal SP2 to write the data voltage Data into the gates of drive transistors M0 of the second row of pixel circuits and simultaneously compensate for threshold voltages of the drive transistors M0. In this way, there is one row of waiting time after the first transistors M1 in the first row of pixel circuits are turned off, the second transistors M2 in the first row of pixel circuits are still turned on during this time, the charges stored in the first terminals of the drive transistors M0 still perform threshold voltage compensations for the gates of the drive transistors M0, and the threshold compensation time of the first row of pixel circuits is greater than the threshold compensation time of the second row of pixel circuits, so the degrees of the threshold compensations for the drive transistors M0 in the first row and the second row of pixel circuits are different. In the case where the same one data voltage Data is written into the two rows of pixel circuits, light-emitting elements D0 in one of the two rows of pixel circuits have darker brightness while light-emitting elements in the other one of the two rows of pixel circuits have brighter brightness. As a result, a display picture of alternation of bright lines and dark lines is finally presented. Especially for wearable display products, their row time is as long as 30 μs to 50 μs, making the preceding phenomenon more noticeable.

Figure 3:
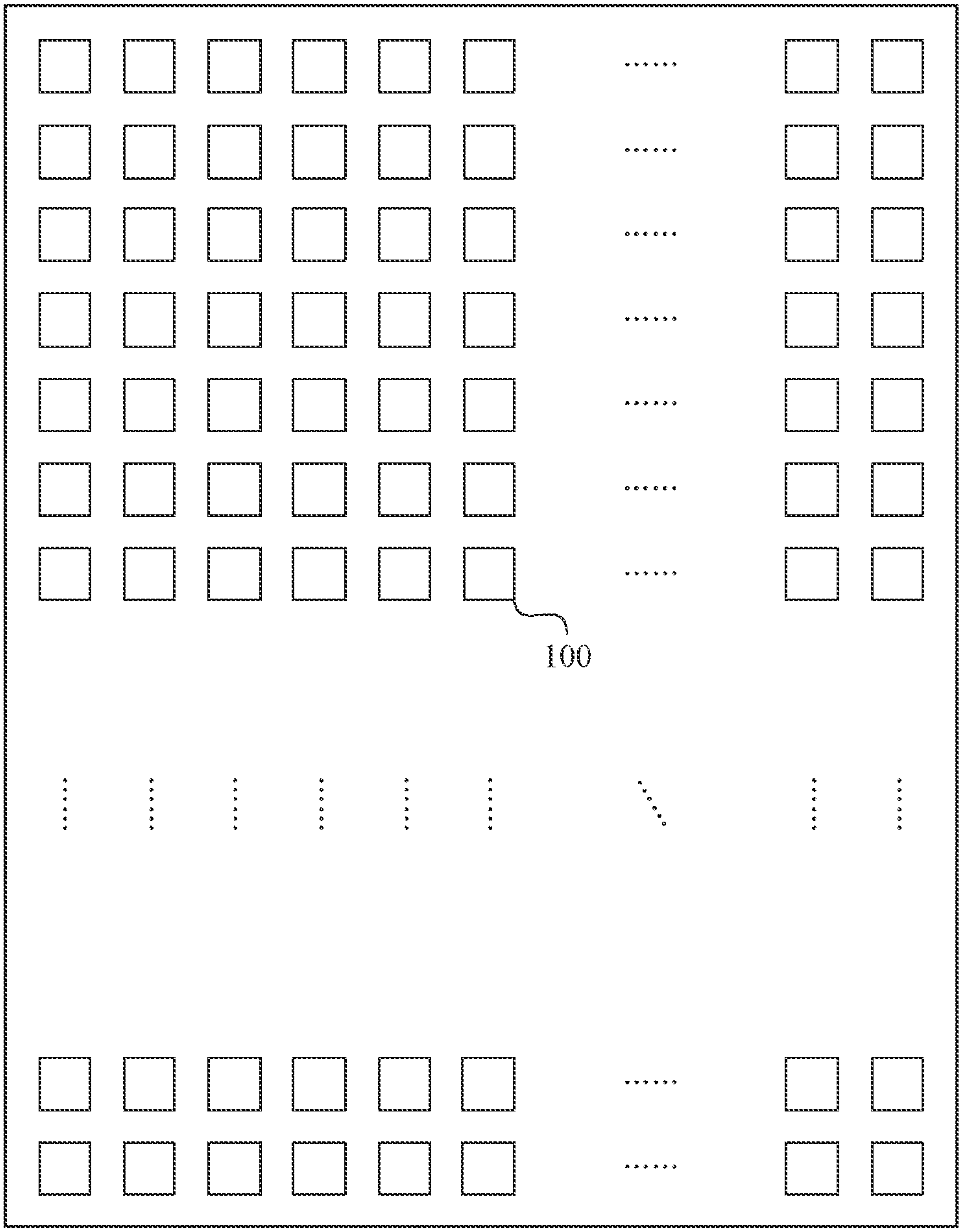
FIG. 3 is a diagram illustrating the structure of a display panel according to embodiments of the present disclosure.
Figure 4:
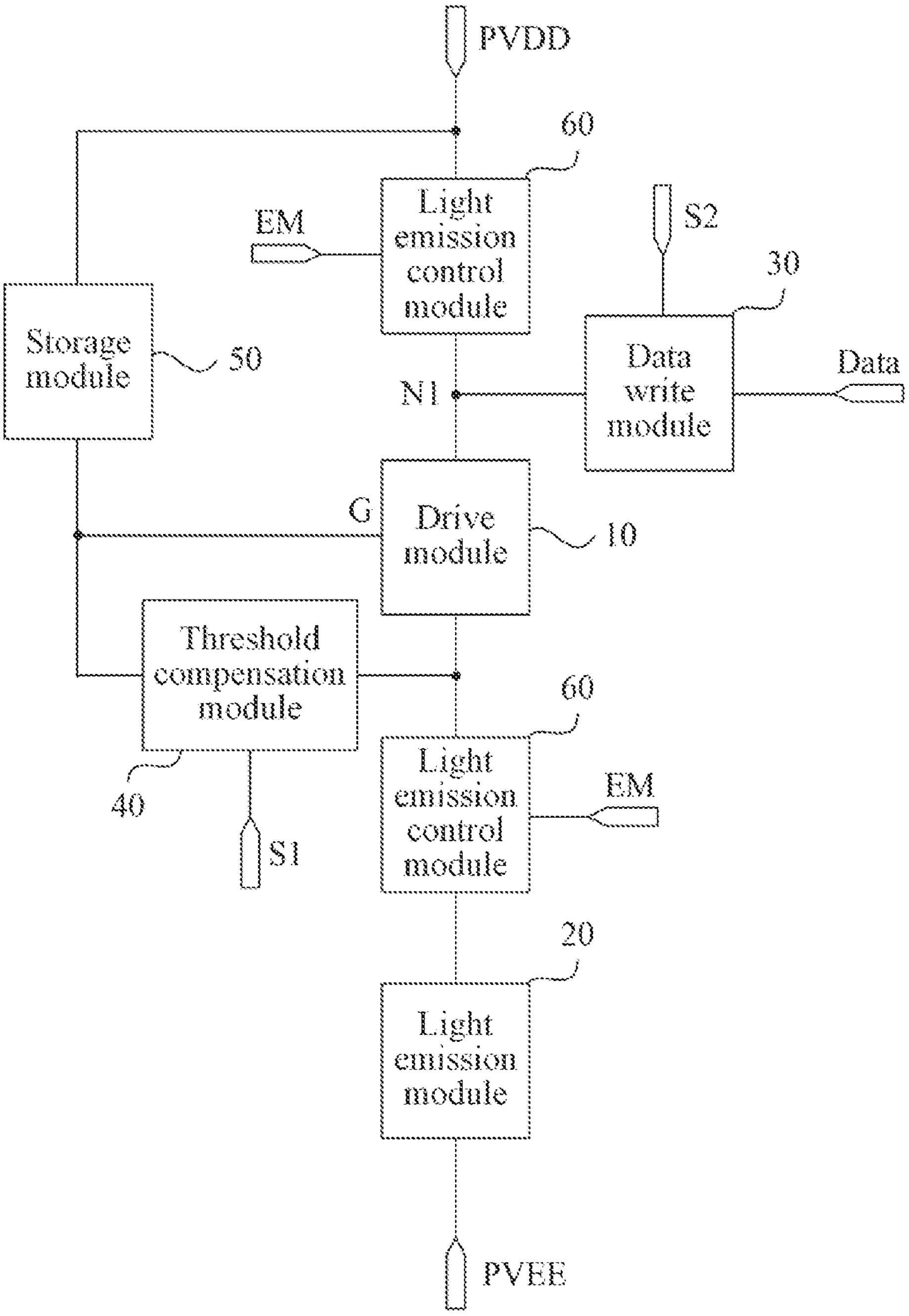
FIG. 4 is a diagram illustrating the structure of a pixel circuit applicable to the display panel.
Figure 5:
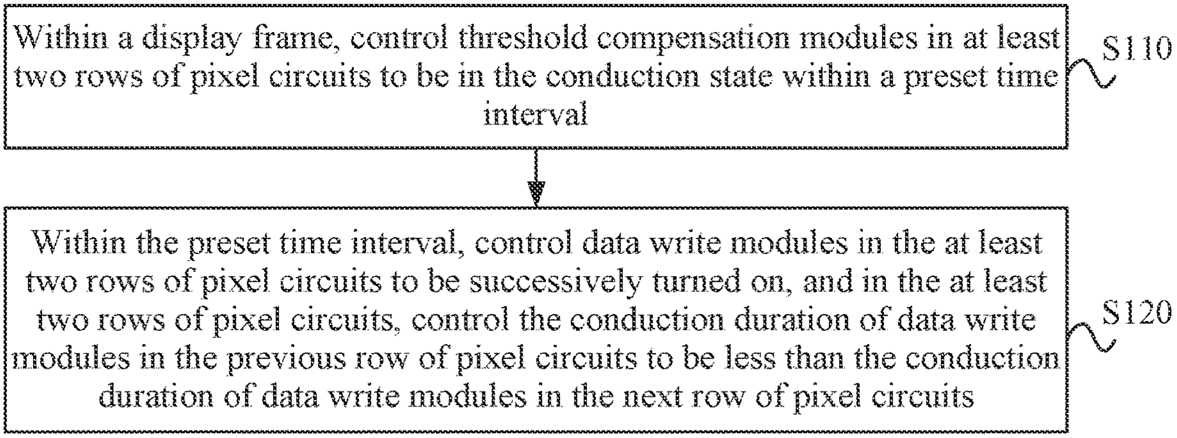
FIG. 5 is a flowchart of a method for driving a display panel according to embodiments of the present disclosure.

In view of this, embodiments of the present disclosure provide a method for driving a display panel. FIG. 3 is a diagram illustrating the structure of a display panel according to embodiments of the present disclosure. FIG. 4 is a diagram illustrating the structure of a pixel circuit applicable to the display panel. FIG. 5 is a flowchart of a method for driving a display panel according to embodiments of the present disclosure. In conjunction with FIGS. 3 and 4, the display panel includes multiple rows of pixel circuits 100. A pixel circuit 100 includes a drive module 10, a light emission module 20, a data write module 30 and a threshold compensation module 40. The drive module 10 is configured to drive the light emission module 20 to emit light. The data write module 30 is connected between the data voltage terminal and the first terminal of the drive module 10. The data voltage terminal is connected to the data voltage Data. The data write module 30 is configured to write the data voltage Data into the drive module 10. The threshold compensation module 40 is connected between the second terminal of the drive module 10 and the control terminal of the drive module 10 and is configured to compensate for the threshold voltage of the drive module 10.

Referring to FIG. 5, the method for driving a display panel specifically includes the steps below.

In S110, within a display frame, threshold compensation modules in at least two rows of pixel circuits are controlled to be in the conduction state within a preset time interval.

Specifically, in conjunction with FIGS. 3 and 4, the display panel in the embodiments of the present disclosure may be an organic light-emitting diode (OLED) display panel or a micron-level light-emitting diode (Micro-LED) display panel. The display frame includes the preset time interval, and the working stage of the pixel circuit 100 includes a data write stage. The data write stage of each of the at least two rows of pixel circuits 100 is located within the preset time interval. The duration of the preset time interval may be greater than or equal to the total duration of the data write stage of the each of the at least two rows of pixel circuits. In the preset time interval of each display frame, the threshold compensation modules 40 in the at least two rows of pixel circuits 100 may be controlled to be in the conduction state to simultaneously scan and drive the at least two rows of pixel circuits 100. In this way, the threshold compensation modules 40 in the at least two rows of pixel circuits 100 can be driven by the same one shift register circuit so that the number of shift register circuits in the display panel can be reduced to reducing the bezel area of the display panel.

The at least two rows of pixel circuits 100 include two or more rows of pixel circuits 100, and rows in the at least two rows of pixel circuits 100 may be adjacent to each other or may also be spaced apart.

In S120, within the preset time interval, data write modules in the at least two rows of pixel circuits are controlled to be successively turned on, and in the at least two rows of pixel circuits, the conduction duration of data write modules in the previous row of pixel circuits are controlled to be less than the conduction duration of data write modules in the next row of pixel circuits.

Within the preset time interval, according to the order in which the multiple rows of pixel circuits 100 are arranged in the display panel, data write modules 30 in the multiple rows of pixel circuits 100 are controlled to be successively turned on to enable data voltage terminals, data write modules 30, drive modules 10, threshold compensation modules 40 and control terminals G of the drive modules 10 in each row of pixel circuits 100 to form a conduction path so that the data voltage Data can be transmitted to the control terminals G of the drive modules 10 for storage through the conduction path and the threshold voltages of the drive modules 10 can be simultaneously compensated. The data voltage is written into the multiple rows of pixel circuits 100 successively, and threshold voltage compensations for the multiple rows of pixel circuits 100 are performed.

The "previous row" and the "next row" of pixel circuits 100 refer to the row having the first scan drive order and the row having the next scan drive order in every two rows of pixel circuits 100. Exemplarily, the scan drive order of the display panel includes, but is not limited to, the following two kinds. One is to perform a scan drive from one row of pixel circuits 100 farthest from the display driver chip to one row of pixel circuits 100 closest to the display driver chip one by one in the display panel, and the other one is to perform the scan drive from the row of pixel circuits 100 closest to the display driver chip to the row of pixel circuits 100 farthest from the display driver chip one by one in the display panel, so the previous row and the next row of pixel circuits 100 in every two rows of pixel circuits 100 may be determined according to the scan drive order. The row of pixel circuits 100 having the first scan drive order is denoted as the previous row of pixel circuits 100, and the row of pixel circuits 100 having the next scan drive order is denoted as the next row of pixel circuits 100. For example, in the display panel, the first row of pixel circuits 100 is farthest from the display driver chip, and the last row of pixel circuits 100 is closest to the display driver chip. In the case where the successive scan drive order is from the first row of pixel circuits 100 to the last row of pixel circuits 100, when the at least two rows of pixel circuits 100 are the jth row, the (j+1)th row and the (j+2)th row of pixel circuits 100, the jth row is the previous row relative to the (j+1)th row, the (j+1)th row is the next row relative to the jth row, the (j+1)th row is the previous row relative to the (j+2)th row, and the (j+2)th row is the next row relative to the (j+1)th row. Similarly, when the at least two rows of pixel circuits 100 are the jth row and the (j+2)th row of pixel circuits 100 or the jth row and the (j+1)th row of pixel circuits 100, the "previous row" and the "next row" of pixel circuits 100 may be determined accordingly.

For every two rows of pixel circuits 100 in the at least two rows of pixel circuits 100, after the data write stages of the previous row of pixel circuits 100 end, and the data write modules 30 of the previous row of pixel circuits 100 are turned off, the data write stages of the next row of pixel circuits 100 start, and the data write modules 30 of the next row of pixel circuits 100 are turned on, and a data voltage is written into the next row of pixel circuits 100, and threshold voltage compensations are performed. Meanwhile, threshold compensation modules 40 of the previous row of pixel circuits 100 are still turned on, and the voltages stored in the first nodes N1 of the previous row of pixel circuits 100 are continuously transmitted to the control terminals G of the drive modules 10 through the drive modules 10 and the threshold compensation modules 40 to perform the threshold voltage compensations for the drive modules 10 so that the actual duration of the threshold voltage compensation for the previous row of pixel circuits 100 can be greater than the duration of the threshold voltage compensation for the next row of pixel circuits 100. In the case where the conduction durations of data write modules 30 in the multiple rows of pixel circuits 100 are equal, the actual durations of threshold voltage compensations for the previous row and the next row of pixel circuits 100 are quite different. Compared with the case where the conduction durations of the data write modules 30 in the multiple rows of pixel circuits 100 are equal, in the technical solution of this embodiment of the present disclosure, the conduction duration of the data write modules 30 in the previous row of pixel circuits 100 is less than the conduction duration of the data write modules 30 in the next row of pixel circuits so that the difference between the actual durations of the threshold voltage compensations for the previous row and the next row of pixel circuits 100 can be reduced, and the degrees of the threshold voltage compensations for the previous row and the next row of pixel circuits 100 can be close to reduce the brightness difference between the light emission modules 20 driven by the previous row and the next row of pixel circuits 100.

It can be seen that, in the technical solution of this embodiment of the present disclosure, within the display frame, the threshold compensation modules in the at least two rows of pixel circuits are controlled to be simultaneously turned on, and when the threshold compensation modules in the at least two rows of pixel circuits are turned on, the data write modules in the at least two rows of pixel circuits are controlled to be successively turned on, and the conduction duration of the data write modules in the previous row of pixel circuits is controlled to be less than the conduction duration of the data write modules in the next row of pixel circuits. On one hand, the threshold compensation modules in the at least two rows of pixel circuits can be driven by the same one shift register circuit to reduce the number of shift register circuits in the display panel so that the design of the narrow bezel can be implemented, and on the other hand, the duration differences of the threshold voltage compensations for the multiple rows of pixel circuits can be reduced to balance the degrees of the threshold voltage compensations for the multiple rows of pixel circuits so that the brightness differences of the light emission modules driven by the multiple rows of pixel circuits can be reduced, and thereby the brightness uniformity of the display panel can be improved.

Figure 6:
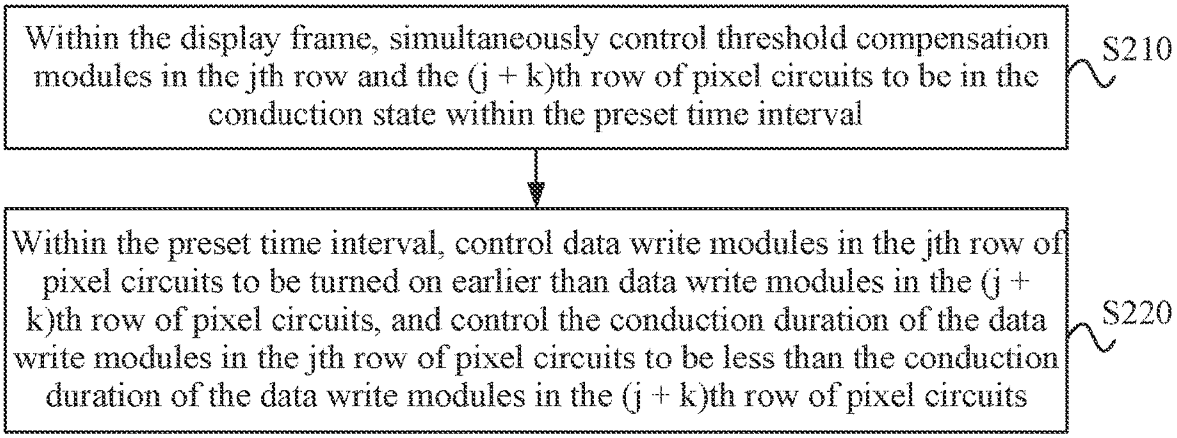
FIG. 6 is a flowchart of another method for driving a display panel according to embodiments of the present disclosure.

Based on the preceding embodiment, optionally, the at least two rows of pixel circuits include the jth row and the (j+k)th row of pixel circuits, where j≥1, k≥1, j+k≤m, m is the total number of rows of pixel circuits, and j, k and m are each an integer. FIG. 6 is a flowchart of another method for driving a display panel according to embodiments of the present disclosure. Referring to FIG. 6, the method specifically includes the steps below.

In S210, within the display frame, threshold compensation modules in the jth row and the (j+k)th row of pixel circuits are simultaneously controlled to be in the conduction state within the preset time interval.

In conjunction with FIGS. 3 and 4, optionally, in an embodiment, the at least two rows of pixel circuits 100 include two adjacent rows of pixel circuits 100, that is, k=1. The jth row and the (j+k)th row of pixel circuits 100 may be an odd-numbered row and an even-numbered row of pixel circuits 100 that are adjacent to each other. For example, the jth row and the (j+k)th row of pixel circuits 100 include the first row and the second row of pixel circuits 100, the third row and the fourth row of pixel circuits 100, and the fifth row and the sixth row of pixel circuits 100, and others.

In another embodiment, the at least two rows of pixel circuits 100 may be two rows of pixel circuits 100 that are not adjacent to each other, that is, k>1, and at least one row of pixel circuits 100 is sandwiched between the jth row and the (j+k)th row of pixel circuits 100. For example, when k=2, the jth row and the (j+k)th row of pixel circuits 100 include the first row and the third row of pixel circuits 100, the second row and the fourth row of pixel circuits 100, the fifth row and the seventh row of pixel circuits 100, and the sixth row and the eighth row of pixel circuits 100, and others. When k=3, the jth row and the (j+k)th row of pixel circuits 100 include the first row and the fourth row of pixel circuits 100, the second row and the fifth row of pixel circuits 100, the third row and the sixth row of pixel circuits 100, and the seventh row and the tenth row of pixel circuits 100, the eighth row and the eleventh row of pixel circuits 100, and the ninth row and the twelfth row of pixel circuits 100, and others.

In S220, within the preset time interval, data write modules in the jth row of pixel circuits are controlled to be turned on earlier than data write modules in the (j+k)th row of pixel circuits, and the conduction duration of the data write modules in the jth row of pixel circuits is controlled to be less than the conduction duration of the data write modules in the (j+k)th row of pixel circuits.

Within the preset time interval, the data write modules 30 in the jth row of pixel circuits 100 are first controlled to be turned on so that the data voltage Data can be written into the control terminals G of the drive modules 10 for storage through the data write modules 30, the drive modules 10 and the threshold compensation modules 40 in the jth row of pixel circuits 100 and the threshold voltages of the drive modules 10 can be simultaneously compensated. After the data write modules 30 in the jth row of pixel circuits 100 are turned off, the data write modules 30 in the (j+k)th row of pixel circuits 100 are controlled to be turned on so that the data voltage Data can be written into the control terminals G of the drive modules 10 for storage through the data write modules 30, the drive modules 10 and the threshold compensation modules 40 in the (j+k)th row of pixel circuits 100 and the threshold voltages of the drive modules 10 can be simultaneously compensated. After the data write modules 30 in the jth row and the (j+k)th row of pixel circuits 100 are turned off, the threshold compensation modules 40 in the jth row and the (j+k)th row of pixel circuits 100 are turned off.

After the data write modules 30 in the jth row of pixel circuits 100 are turned off, when the (j+k)th row of pixel circuits 100 perform a data voltage write and a threshold voltage compensation, the threshold compensation modules 40 in the jth row of pixel circuits 100 are still turned on, and the voltages stored in the first nodes N1 of the jth row of pixel circuits 100 are continuously transmitted to the control terminals G of the drive modules 10 through the drive modules 10 and the threshold compensation modules 40 to perform threshold voltage compensations for the drive modules 10 so that the actual duration of the threshold voltage compensation for the jth row of pixel circuits 100 can be greater than the conduction duration of the data write modules 30 in the jth row of pixel circuits 100. The conduction duration of the data write modules 30 in the jth row of pixel circuits 100 is less than the conduction duration of the data write modules 30 in the (j+k)th row of pixel circuits 100 so that the difference between the actual durations of the threshold voltage compensations for the jth row and the (j+k)th row of pixel circuits 100 can be reduced, and the degrees of the threshold voltage compensations for the jth row and the (j+k)th row of pixel circuits 100 can be close to reduce the brightness difference between the light emission modules 20 driven by the jth row and the (j+k)th row of pixel circuits 100.

Figure 7:
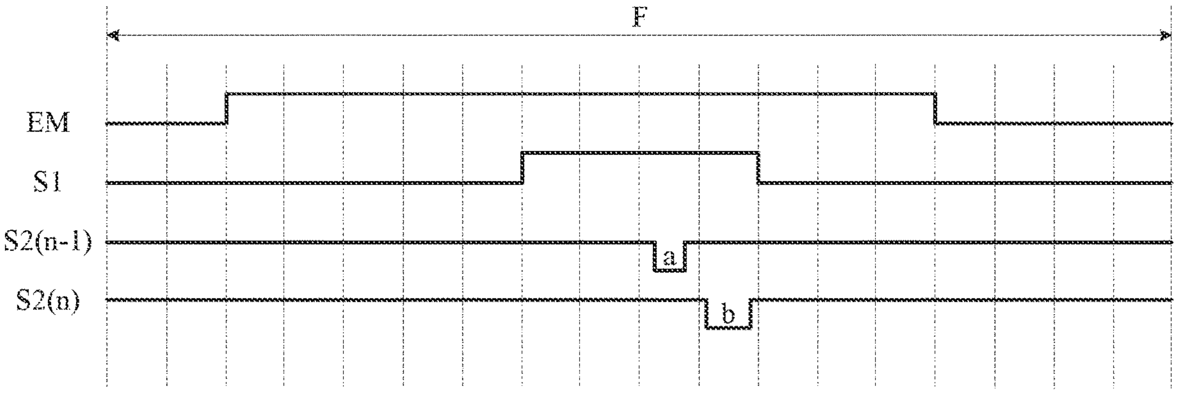
FIG. 7 is a drive timing diagram of a pixel circuit according to embodiments of the present disclosure.

FIG. 7 is a drive timing diagram of a pixel circuit according to embodiments of the present disclosure, which is applicable to driving the pixel circuit shown in FIG. 4 to work. In conjunction with FIGS. 4 and 7, in an embodiment, the control terminal of the threshold compensation module 40 is configured to input the first scan signal S1, and the control terminal of the data write module 30 is configured to input the second scan signal S2.

Optionally, that the threshold compensation modules in the at least two rows of pixel circuits are controlled to be in the conduction state within the preset time interval includes that first scan signals S1 are supplied to the control terminals of the threshold compensation modules 40 in the at least two rows of pixel circuits.

That the data write modules in the at least two rows of pixel circuits are controlled to be successively turned on includes that second scan signals S2 are supplied to the control terminals of the data write modules 30 in the at least two rows of pixel circuits.

In the at least two rows of pixel circuits, the same one first scan signal S1 is input into the at least two rows of pixel circuits, the preset time interval is the time interval of a conduction voltage level in the first scan signal S1 input into the at least two rows of pixel circuits, the time intervals of the conduction voltage level in the second scan signals S2 input into the at least two rows of pixel circuits are each located within the preset time interval, that is, within the time interval of the conduction voltage level in the first scan signal S1. The timing of a conduction voltage level in the second scan signal S2 input into the previous row of pixel circuits is earlier than the timing of a conduction voltage level in the second scan signal S2 input into the next row of pixel circuits, and the continuous duration of the conduction voltage level in the second scan signal S2 input into the previous row of pixel circuits is shorter than the continuous duration of the conduction voltage level in the second scan signal S2 input into the next row of pixel circuits.

Specifically, the threshold compensation modules 40 are turned on in response to the conduction voltage level in the first scan signal S1, and the data write modules 30 are turned on in response to the conduction voltage level in the second scan signals S2. The conduction voltage level controlling the data write modules 30 and the threshold compensation modules 40 may be high levels or low levels, and may be the same or different.

An illustration is made using an example in which the at least two rows of pixel circuits are the n−1th row and the nth row of pixel circuits, where 2≤n≤m, and m is the total number of rows of pixel circuits. For ease of distinguishing, the second scan signal connected to data write modules 30 in the n−1th row of pixel circuits is denoted as S2(*n*−1), and the second signal connected to the data write modules in the nth row of pixel circuits is denoted as S2(*n*). Exemplarily, in the case where the conduction voltage level in the first scan signal S1 is at a high level, and the conduction voltage level in the second scan signals S2 is at a low level, within the display frame F, the time interval in which the first scan signal S1 is at a high level is the preset time interval, when the first scan signal S1 connected to the n−1th row and the nth row of pixel circuits is at a high level, low levels in the second scan signals S2(*n*−1) and S2(*n*) connected to the n−1th row and the nth row of pixel circuits sequentially arrive, and the continuous duration a of the low level in the second scan signal S2(*n*−1) connected to the n−1th row of pixel circuits is shorter than the continuous duration b of the low level in the second scan signal S2(*n*) connected to the nth row of pixel circuits.

Within the display frame F, the first scan signal S1 is supplied to the control terminals of the threshold compensation modules 40 in the n−1th row and the nth row of pixel circuits, the second scan signal S2(*n*−1) is supplied to the control terminals of the data write modules 30 in the n−1th row of pixel circuits, and the second scan signal S2(*n*) is supplied to the control terminals of the data write modules 30 in the nth row of pixel circuits so that the threshold compensation modules 40 in the n−1th row and the nth row of pixel circuits can be turned on in response to the high level in the first scan signal S1. Meanwhile, the data write modules 30 in the n−1th row of pixel circuits are turned on in response to the low level in the second scan signal S2(*n*−1), the data write modules 30 in the nth row of pixel circuits are turned on in response to the low level in the second scan signal S2(*n*), the data write modules 30 in the n−1th row of pixel circuits are turned on earlier than the data write modules 30 in the nth row of pixel circuits, and the conduction duration of the data write modules 30 in the n−1th row of pixel circuits is less than the conduction duration of the data write modules 30 in the nth row of pixel circuits to reduce the difference between the actual durations of the threshold voltage compensations for the n−1th row and the nth row of pixel circuits 100 so that the degrees of the threshold voltage compensations for the n−1th row and the nth row of pixel circuits 100 can be close, and thereby the brightness difference between the light emission modules 20 driven by the n−1th row and the nth row of pixel circuits 100 can be reduced.

With continued reference to FIG. 4, optionally, the pixel circuit further includes a storage module 50 and a light emission control module 60. The first terminal of the storage module 50 is connected to the control terminal G of the drive module 10, the second terminal of the storage module 50 is connected to a fixed voltage, for example, the second terminal of the storage module 50 is connected to a first power terminal connected to a first power voltage PVDD, and the storage module 50 is configured to store the voltage of the control terminal G of the drive module 10. The light emission control module 60, the drive module 10 and the light emission module 20 are connected between the first power terminal and a second power terminal. The second power terminal is connected to a second power voltage PVEE. The first power voltage PVDD is greater than the second power voltage PVEE. The control terminal of the light emission control module 60 is connected to a light emission control signal EM and is turned on or off in response to the light emission control signal EM. The time intervals of the conduction voltage level in the first scan signal S1 and the conduction voltage level in the second scan signals S2 are each located within the time interval of an off level in the light emission control signal EM. The off level in the light emission control signal EM refers to a level for controlling the light emission control module 60 to be turned off.

Figure 8:
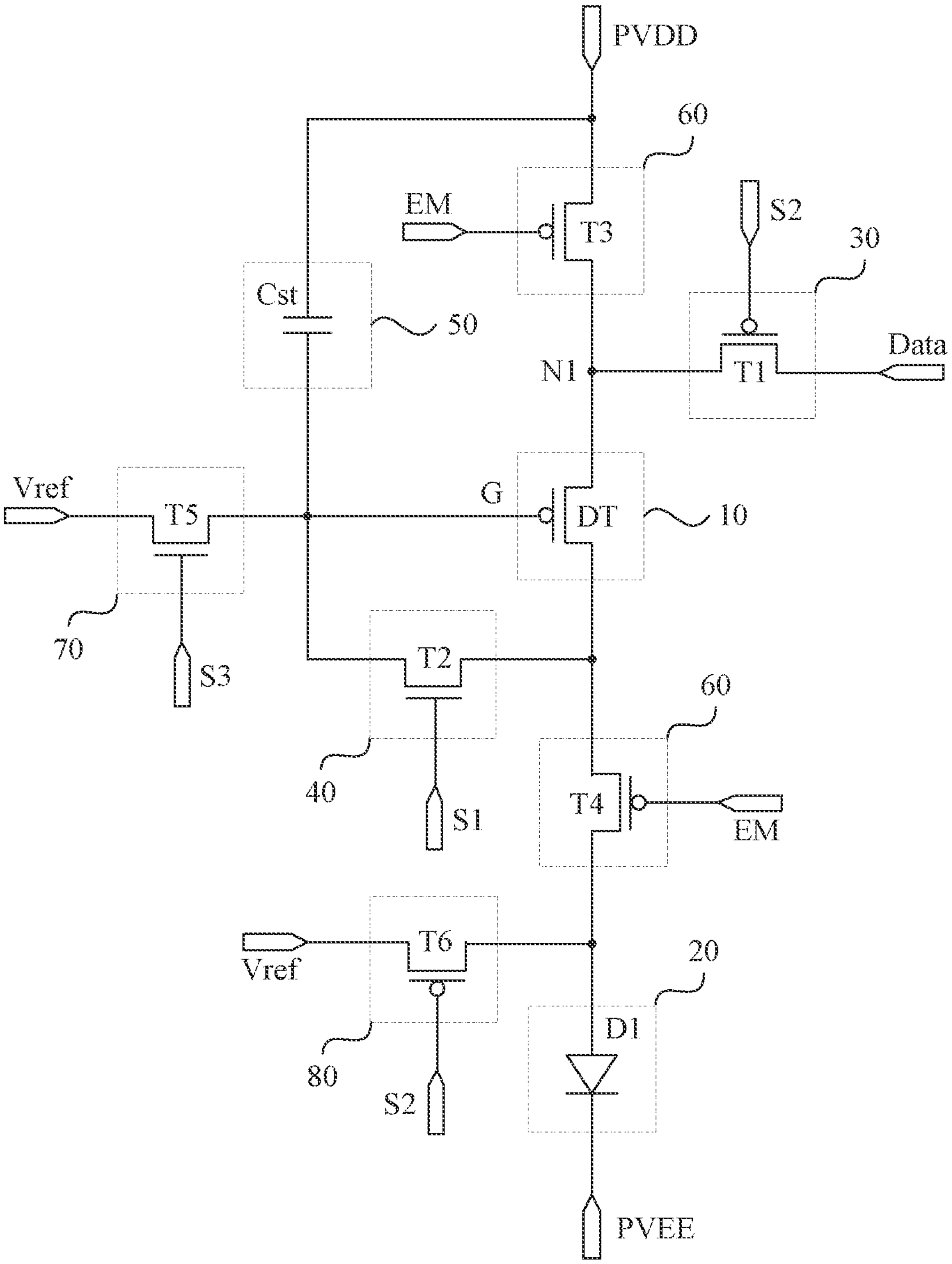
FIG. 8 is a diagram illustrating the structure of another pixel circuit applicable to the display panel.

FIG. 8 is a diagram illustrating the structure of another pixel circuit applicable to the display panel. Referring to FIG. 8, based on the preceding embodiments, optionally, the pixel circuit further includes a first initialization module 70 and a second initialization module 80. The control terminal of the first initialization module 70 is connected to a third scan signal S3, the first terminal of the first initialization module 70 is connected to an initialization voltage Vref, the second terminal of the first initialization module 70 is connected to the control terminal G of the drive module 10, and the first initialization module 70 is configured to be turned on in response to a conduction voltage level in the third scan signal S3 in the initialization stage within the display frame to write the initialization voltage Vref into the control terminal G of the drive module 10 to initialize the voltage of the control terminal G of the drive module 10. The control terminal of the second initialization module 80 is connected to the second scan signal S2, the first terminal of the second initialization module 80 is connected to the initialization voltage Vref, the second terminal of the second initialization module 80 is connected to the first terminal of the light emission module 20, and the second initialization module 80 is configured to write the initialization voltage Vref into the first terminal of the light emission module 20 in response to the conduction voltage level in the second scan signal S2.

With continued reference to FIG. 8, further, the drive module 10 includes a drive transistor DT, the data write module 30 includes a first transistor T1, and the threshold compensation module 40 includes a second transistor T2. The gate of the first transistor T1 is configured to input the second scan signal S2, the first transistor T1 is connected between the data voltage terminal and the first electrode of the drive transistor DT, the gate of the second transistor T2 is configured to input the first scan signal S1, and the second transistor T2 is connected between the second electrode of the drive transistor DT and the gate of the drive transistor DT. Accordingly, that the first scan signal S1 is supplied to the control terminals of the threshold compensation modules 40 in the at least two rows of pixel circuits includes that the first scan signal S1 is supplied to the gates of second transistors T2 in the at least two rows of pixel circuits. That the second scan signals S2 are supplied to the control terminals of the data write modules 40 in the at least two rows of pixel circuits includes that the second scan signals S2 are supplied to the gates of the first transistors T1 in the at least two rows of pixel circuits.

With continued reference to FIG. 8, further, the light emission module 20 includes a light-emitting element D1, the storage module 50 includes a storage capacitor Cst, the light emission control module 60 includes a third transistor T3 and a fourth transistor T4, the first initialization module 70 includes a fifth transistor T5, and the second initialization module 80 includes a sixth transistor T6. The light-emitting element D1 may be an OLED or a Micro-LED. The gate of the third transistor T3 and the gate of the fourth transistor T4 are connected to the light emission control signal EM, and the third transistor T3, the drive transistor DT, the fourth transistor T4 and the light-emitting element D1 are successively connected between the first power terminal and the second power terminal. The gate of the fifth transistor T5 is connected to the third scan signal S3, the first electrode of the fifth transistor T5 is connected to the initialization voltage Vref, and the second electrode of the fifth transistor T5 is connected to the gate of the drive transistor DT. The gate of the sixth transistor T6 is connected to the second scan signal S2, the first electrode of the sixth transistor T6 is connected to the initialization voltage Vref, and the second electrode of the sixth transistor T6 is connected to the first electrode of the light-emitting element D1. The first electrode of the storage capacitor Cst is connected to the gate of the drive transistor DT, and the second electrode of the storage capacitor Cst is connected to the first power terminal.

The drive transistor DT and the first transistor T1 to the sixth transistor T6 may be each a p-type transistor or an n-type transistor. The transistors may have the same type or different types. The drive transistor DT and the first transistor T1 to the sixth transistor T6 may use the low-temperature polycrystalline silicon (LTPS) process, or the drive transistor DT, the first transistor T1, the third transistor T3, the fourth transistor T4 and the sixth transistor T6 use the low-temperature polycrystalline silicon (LTPS) process while the second transistor T2 and the fifth transistor T5 use the indium gallium zinc oxide (IGZO) process.

Figure 9:
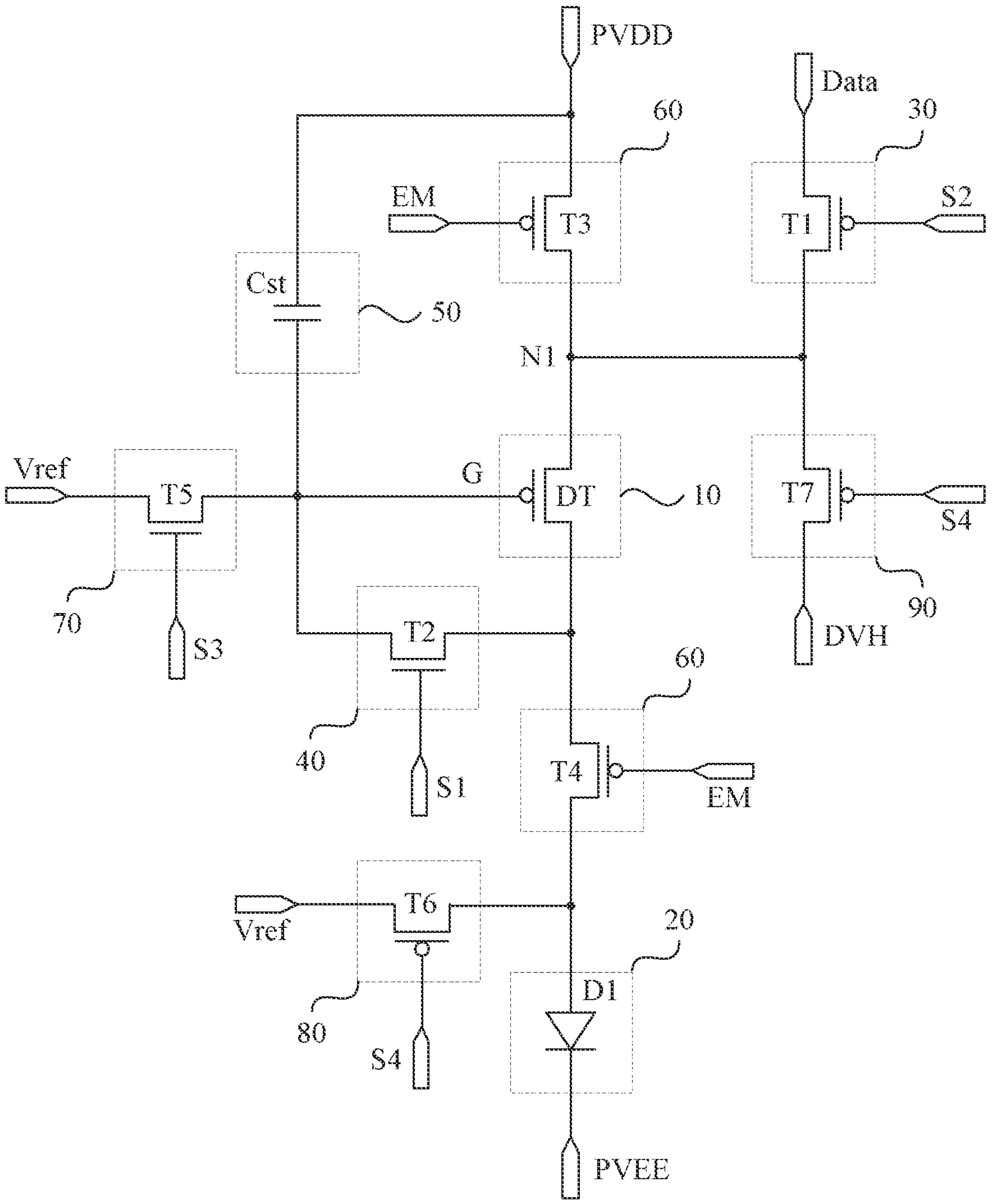
FIG. 9 is a diagram illustrating the structure of another pixel circuit applicable to the display panel.

FIG. 9 is a diagram illustrating the structure of another pixel circuit applicable to the display panel. Referring to FIG. 9, based on the preceding embodiments, the pixel circuit further includes a bias module 90. The control terminal of the bias module 90 is connected to a fourth scan signal S4, the first terminal of the bias module 90 is connected to a bias voltage DVH, the second terminal of the bias module 90 is connected to the first terminal of the drive module 10, and the bias module 90 is configured to transmit the bias voltage DVH to the first terminal of the drive module 10 in response to a conduction voltage level in the fourth scan signal S4 to adjust the bias state of the drive module 10.

Further, the bias module 90 includes a seventh transistor T7. The gate of the seventh transistor T7 is connected to the fourth scan signal S4, the first electrode of the seventh transistor T7 is connected to the bias voltage DVH, and the second electrode of the seventh transistor T7 is connected to the first electrode of the drive transistor DT.

Figure 10:
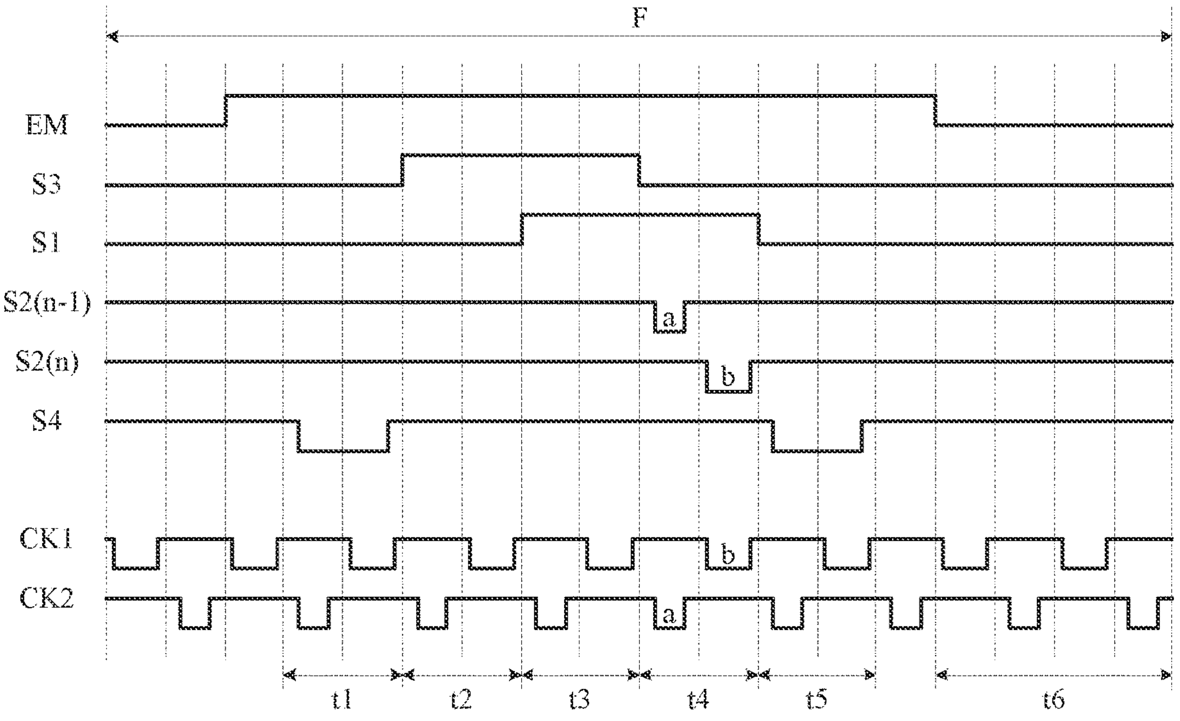
FIG. 10 is a drive timing diagram of another pixel circuit according to embodiments of the present disclosure.

FIG. 10 is a drive timing diagram of another pixel circuit according to embodiments of the present disclosure, which is applicable to driving the pixel circuit shown in FIG. 9 to work. In conjunction with FIGS. 9 and 10, the working principle of the pixel circuit is illustrated below using an example of the n−1th row and the nth row of pixel circuits. Exemplarily, the drive transistor DT, the first transistor T1, the third transistor T3, the fourth transistor T4, the sixth transistor T6 and the seventh transistors T7 are each a p-type transistor while the second transistor T2 and the fifth transistor T5 are each an n-type transistor.

In the first stage t1, when the fourth scan signal S4 is at a low level, the light emission control signal EM is at a high level, the first scan signal S1 and the third scan signal S3 are each at a low level, and the second scan signals S2($n$−1) and S2($n$) connected to the n−1th row and the nth row of pixel circuits are each at a high level. In the n−1th row and the nth row of pixel circuits, sixth transistors T6 and seventh transistors T7 are turned on while other transistors are turned off. The initialization voltage Vref is written into the first electrodes (for example, the anodes) of light-emitting elements D1 through the sixth transistors T6 to initialize the voltages of the first electrodes of the light-emitting elements D1. The bias voltage DVH is written into the first electrodes of the drive transistors DT through the seventh transistors T7 to reset the voltages of the first electrodes of the drive transistors DT so that the bias states of the drive transistors DT in the multiple rows of pixel circuits can be the same.

In the second stage t2, the third scan signal S3 and the fourth scan signal S4 are each at a high level while other signals are the same as in the previous stage. In the n−1th row and the nth row of pixel circuits, fifth transistors T5 are turned on, and sixth transistors T6 and seventh transistors T7 are turned off. The initialization voltage Vref is written into the gates of the drive transistors DT through the fifth transistors T5 to initialize the voltages of the gates of the drive transistors DT.

In the third stage t3, the first scan signal S1 is at a high level while other signals are the same as in the previous stage. In the n−1th row and the nth row of pixel circuits, the second transistors T2 are turned on, and the initialization voltage Vref is also written into the second electrodes of the drive transistors DT through the fifth transistors T5 and the second transistors T2 to initialize the voltages of the second electrodes of the drive transistors DT and control the drive transistors DT in the n−1th row and the nth row of pixel circuits to be turned on.

In the fourth stage t4, the third scan signal S3 is at a low level, and the fifth transistors T5 in the n−1th row and the nth row of pixel circuits are turned off. The low levels in the second scan signal S2($n$−1) connected to the n−1th row of pixel circuits and the second scan signal S2($n$) connected to the nth row of pixel circuits successively arrive. When the second scan signal S2($n$−1) is at a low level, the first transistors T1 in the n−1th row of pixel circuits are turned on, the data voltage Data is written into the gates of the drive transistors DT through the first transistors T1, the drive transistors DT and the second transistors T2 in the n−1th row of pixel circuits successively, and the voltages of the gates of the drive transistors DT are stored through the storage capacitors Cst while the threshold voltages of the drive transistors DT are compensated for. When the second scan signal S2($n$−1) is at a high level, and the second scan signal S2($n$) is at a low level, in the n−1th row of pixel circuits, the first transistors T1 are turned off, the second transistors T2 are kept to be turned on, and the voltages stored in the first nodes N1 are continuously transmitted to the gates of the drive transistors DT through the drive transistors DT and the second transistors T2, and the threshold voltages of the drive transistors DT are compensated for. Meanwhile, the first transistors T1 in the nth row of pixel circuits are turned on, and the data voltage Data is written into the gates of the drive transistors DT through the first transistors T1, the drive transistors DT and the second transistors T2 in the nth row of pixel circuits successively, and the voltages of the gates of the drive transistors DT are stored through the storage capacitors Cst while the threshold voltages of the drive transistors DT are compensated for.

The duration of the threshold voltage compensation for the n−1th row of pixel circuits is a duration from the second scan signal S2(n−1) hopping from being at a high level to being at a low level to the first scan signal S1 hopping from being at a high level to being at a low level. The duration of the threshold voltage compensation for the nth row of pixel circuits is a duration from the second scan signal S2(n) hopping from being at a high level to being at a low level to the first scan signal S1 hopping from being at a high level to being at a low level. Since the continuous duration a of the low level in the second scan signal S2(n−1) connected to the n−1th row of pixel circuits is shorter than the continuous duration b of the low level in the second scan signal S2(n) connected to the nth row of pixel circuits, the duration difference between the threshold voltage compensations for the n−1th row and the nth row of pixel circuits is reduced so that the degrees of the threshold voltage compensations for the n−1th row and the nth row of pixel circuits can be close, and so that in the case where the data voltages Data in the n−1th row and the nth row of pixel circuits are the same, the voltages of the gates of the drive transistors DT in the n−1th row and the nth row of pixel circuits can be close to reduce the brightness difference between the light-emitting elements D1 driven by the n−1th row and the nth row of pixel circuits.

Figure 11:
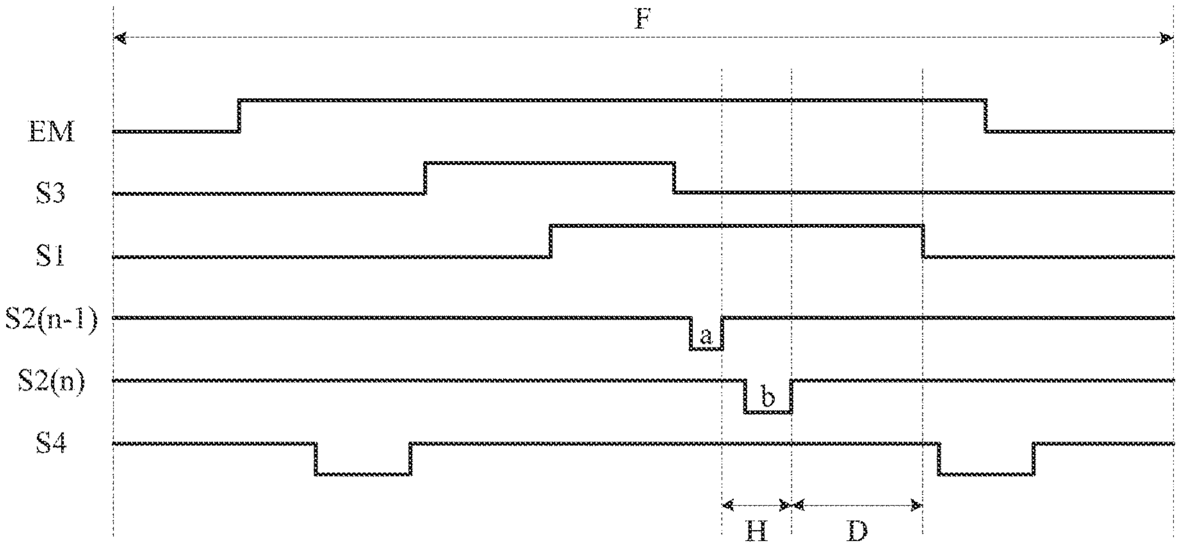
FIG. 11 is a drive timing diagram of another pixel circuit according to embodiments of the present disclosure.

In the fifth stage t5, the first scan signal S1 is at a low level, the second scan signal S2(n−1) connected to the n−1th row of pixel circuits and the second scan signal S2(n) connected to the nth row of pixel circuits are each at a high level, and the first transistors T1 and the second transistors T2 in the n−1th row and the nth row of pixel circuits are turned off. When the fourth scan signal S4 is at a low level, the sixth transistors T6 and the seventh transistors T7 in the n−1th row and the nth row of pixel circuits are turned on, and the initialization voltage Vref is written into the first electrodes of the light-emitting elements D1 through the sixth transistors T6 to initialize the voltages of the first electrodes of the light-emitting elements D1. The bias voltage DVH is written into the first electrodes of the drive transistors DT through the seventh transistors T7 to reset the voltages of the first electrodes of the drive transistors DT so that the bias states of the drive transistors DT in the multiple rows of pixel circuits can be the same. In the sixth stage t6, the light emission control signal EM is at a low level, the fourth scan signal S4 is at a high level while other signals are the same as in the previous stage. In the n−1th row and the nth row of pixel circuits, the sixth transistors T6 and the seventh transistors T7 are turned off, the third transistors T3 and the fourth transistors T4 are turned on, a conduction path is formed between the first power terminals, the third transistors T3, the drive transistors DT, the fourth transistors T4, the light-emitting elements D1 and the second power terminals, and the drive transistors DT generate drive currents according to the voltages stored in the storage capacitors Cst to drive the light-emitting elements D1 to emit light. FIG. 11 is a drive timing diagram of another pixel circuit according to embodiments of the present disclosure, which is applicable to driving the pixel circuit shown in FIG. 9 to work. In conjunction with FIGS. 9 and 11, optionally, in the at least two rows of pixel circuits, the difference between the continuous duration of the conduction voltage level in the second scan signal S2 input into the previous row of pixel circuits and the continuous duration of the conduction voltage level in the second scan signal S2 input into the next row of pixel circuits is the preset difference Δt, and the magnitude of the preset difference Δt is correlated to the magnitude of the first value b, the magnitude of the second value D and the magnitude of the third value H.

The first value b is the continuous duration of the conduction voltage level in the second scan signal S2 input into the next row of pixel circuits, the second value D is a duration from the end of the conduction voltage level in the second scan signal S2 input into the next row of pixel circuits to the end of the conduction voltage level in the first scan signal S1 input into the at least two rows of pixel circuits, and the third value H is a duration from the end of the conduction voltage level in the second scan signal S2 input into the previous row of pixel circuits to the end of the conduction voltage level in the second scan signal S2 input into the next row of pixel circuits.

Exemplarily, an illustration is still made using an example in which the at least two rows of pixel circuits are the n−1th row and the nth row of pixel circuits. The continuous duration of the low level in the second scan signal S2(n−1) connected to the n−1th row of pixel circuits is a, and the continuous duration of the low level in the second scan signal S2(n) connected to the nth row of pixel circuits, that is, the first value, is b, where a<b, and b−a=Δt. The duration from the second scan signal S2(n) connected to the nth row of pixel circuits hopping from being at a low level to being at a high level to the first scan signal S1 connected to the n−1th row and the nth row of pixel circuits hopping from being at a high level to being at a low level is the second value D. The duration from the second scan signal S2(n−1) connected to the n−1th row of pixel circuits hopping from being at a low level to being at a high level to the second scan signal S2(n) connected to the nth row of pixel circuits hopping from being at a low level to being at a high level is the third value H.

Optionally, the magnitude of the preset difference Δt is positively correlated to the magnitude of the first value b. Since b−a=Δt, in the case where a remains unchanged, the larger the first value b, the larger the preset difference Δt requires to be configured, and the smaller the first value b, the smaller the preset difference Δt requires to be configured. Therefore, the magnitude of the preset difference Δt is positively correlated to the magnitude of the first value b.

Optionally, the magnitude of the preset difference Δt is negatively correlated to the magnitude of the second value D. The larger the second value D, the smaller the continuous duration a of the low level in the second scan signal S2(n−1) connected to the n−1th row of pixel circuits and the first value b relative to the second value D, so the smaller the preset difference Δt; the smaller the second value D, the larger the continuous duration a of the low level in the second scan signal S2(n−1) connected to the n−1th row of pixel circuits and the first value b relative to the second value D, so the larger the preset difference Δt. Therefore, the magnitude of the preset difference Δt is negatively correlated to the magnitude of the second value D.

Optionally, the magnitude of the preset difference Δt is positively correlated to the magnitude of the third value H. The actual duration of the threshold voltage compensation for the n−1th row of pixel circuits may be denoted as: a+H+D, and the actual duration of the threshold voltage compensation for the nth row of pixel circuits may be denoted as: b+D, so the duration difference between the threshold voltage compensations for the two rows of pixel circuits may be denoted as: a−b+H=H−Δt. To reduce the duration difference between the threshold voltage compensations for the two rows of pixel circuits, the larger the third value H, the larger Δt requires to be configured, and the smaller the third value H, the smaller Δt requires to be configured. Therefore, the magnitude of the preset difference Δt is positively correlated to the magnitude of the third value H.

Optionally, the preset difference Δt ranges from H/25 to H/5. Exemplarily, in the case where the data voltages Data in the n−1th row and the nth row of pixel circuits are the same, the current for the threshold voltage compensation for the n−1th row of pixel circuits when the second scan signal S2(*n*−1) is at a low level and the current for the threshold voltage compensation for the nth row of pixel circuits when the second scan signal S2(*n*) is at a low level are each denoted as $I_1$, the current for the threshold voltage compensation for the n−1th row of pixel circuits during the duration from the second scan signal S2(*n*−1) hopping from being at a low level to being at a high level to the second scan signal S2(*n*) hopping from being at a low level to being at a high level is denoted as $I_2$, and since the voltages of the first nodes N1 of the n−1th row of pixel circuits are not constant data voltages Data, when the voltages of the first nodes N1 are continuously transmitted to the gates of the drive transistors DT and perform threshold voltage compensation, the current $I_2$ is relatively small. Optionally, $I_2$ is about 1/25 to 1/5 of $T_1$, that is, $I_2 \approx I_1/25$ to $I_1/5$, the magnitude of $I_1$ is mainly affected by later threshold voltage compensation, and the current $I_1$ of the later threshold voltage compensation is about 1 nA.

It can be seen from the preceding analysis that the difference between the actual durations of the threshold voltage compensations for the n−1th row and the nth row of pixel circuits may be denoted as: H−Δt, so the difference between charge amounts of the threshold voltage compensations for the n−1th row and the nth row of pixel circuits may be denoted as: $H*I_2-\Delta t*I_1$. To eliminate the difference between the charge amounts of the threshold voltage compensations for the n−1th row and the nth row of pixel circuits, it may be configured as follows: $\Delta t*I_1=H*I_2$. Since $I_2 \approx I_1/25$ to $I_1/5$, the magnitude of $\Delta t*I_1$ ranges from $(H*I_1)/25$ to $(H*I_1)/5$, and the magnitude of the preset difference Δt ranges from H/25 to H/5.

In an embodiment, $I_2 \approx I_1/20$ to $I_1/10$, so the magnitude of the preset difference Δt ranges from H/20 to H/10.

Figure 12:
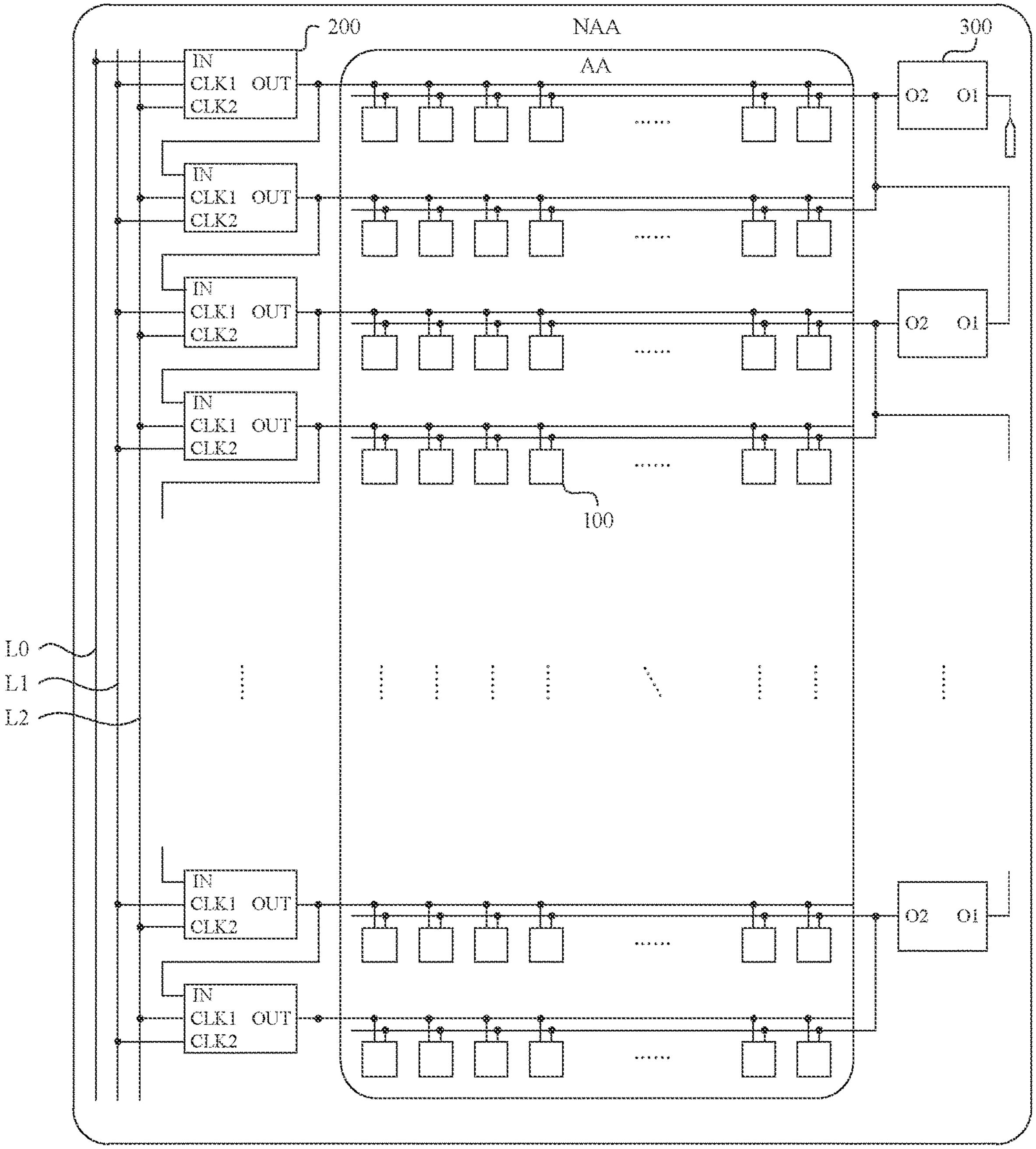
FIG. 12 is a diagram illustrating the structure of another display panel according to embodiments of the present disclosure.
Figure 13:
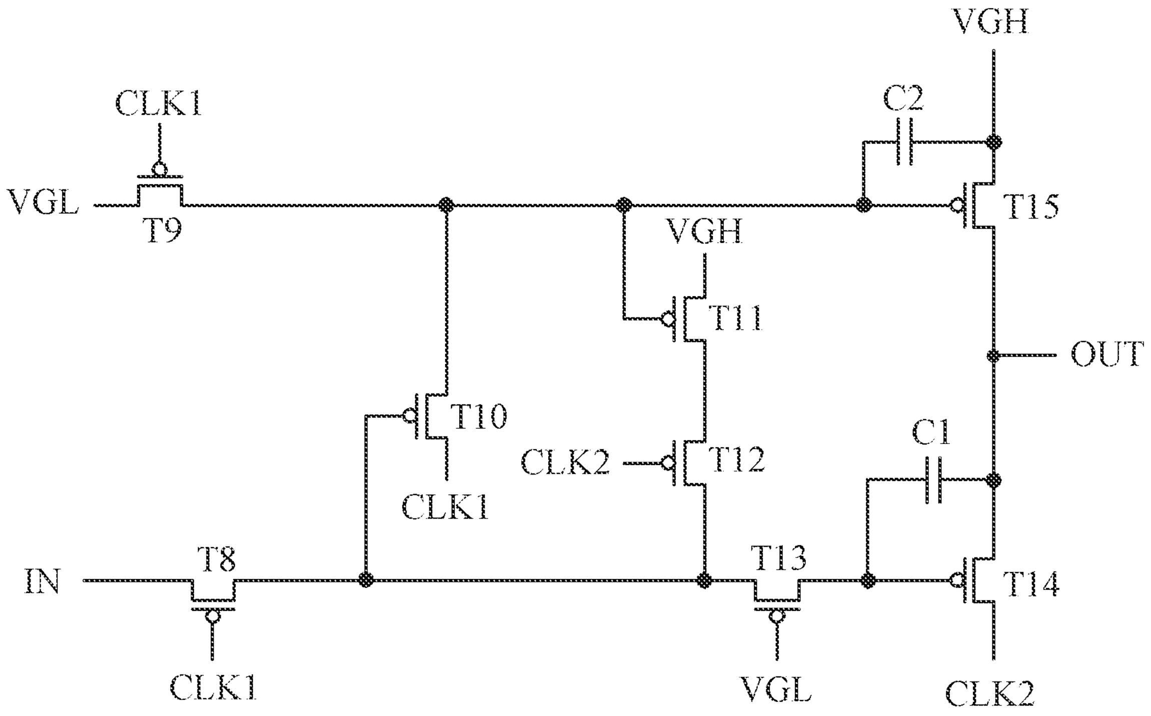
FIG. 13 is a diagram illustrating the structure of a first shift register circuit applicable to the display panel.

FIG. 12 is a diagram illustrating the structure of another display panel according to embodiments of the present disclosure. FIG. 13 is a diagram illustrating the structure of a first shift register circuit applicable to the display panel. In conjunction with FIGS. 9, 10, 12 and 13, based on the preceding embodiments, the display panel further includes multiple first shift register circuits 200 cascaded, the multiple first shift register circuit 200 generate second scan signals S2 having successively backward timings, stage by stage, and the ith first shift register circuit 200 is connected to the control terminals of data write modules 30 in the ith row of pixel circuits 100 to supply a second scan signal S2 to the control terminals of the data write modules 30 in the ith row of pixel circuits 100, where 1≤i≤m, and m is the total number of rows of pixel circuits 100.

Accordingly, that the data write modules in the at least two rows of pixel circuits are controlled to be turned on includes that second scan signals S2 are supplied to the control terminals of the data write modules 30 in the at least two rows of pixel circuits 100 through corresponding first shift register circuits 200.

Further, the display panel further includes a first clock signal line L1 and a second clock signal line L2, the first clock signal line L1 transmits a first clock signal CK1, and the second clock signal line L2 transmits a second clock signal CK2.

A first shift register circuit 200 includes a start signal terminal IN, a first clock signal terminal CLK1, a second clock signal terminal CLK2 and an output terminal OUT, the start signal terminal IN of the first first shift register circuit 200 is connected to a start signal, and the start signal terminal IN of the next first shift register circuit 200 is connected to the output terminal OUT of the previous first shift register circuit 200.

When the at least two rows of pixel circuits are the jth row and the (j+k)th row of pixel circuits, the first clock signal terminal CLK1 of the jth first shift register circuit 200 is connected to the first clock signal line L1, the second clock signal terminal CLK2 of the jth first shift register circuit 200 is connected to the second clock signal line L2, the first clock signal terminal CLK1 of the (j+k)th first shift register circuit 200 is connected to the second clock signal line L2, and the second clock signal terminal CLK2 of the (j+k)th first shift register circuit 200 is connected to the first clock signal line L1, where j≥1, k≥1, j+k≤m, and j and k are each an integer.

The continuous duration a of a conduction voltage level in the second clock signal CK2 is less than the continuous duration b of a conduction voltage level in the first clock signal CK1.

Accordingly, that the second scan signals S2 are supplied to the control terminals of the data write modules 30 in the at least two rows of pixel circuits 100 through the corresponding first shift register circuits 200 includes that a second scan signal S2 is supplied to the control terminals of the data write modules 30 in the jth row of pixel circuits through the jth first shift register circuit 200, and a second scan signal S2 is supplied to the control terminals of the data write modules 30 in the (j+k)th row of pixel circuits through the (j+k)th first shift register circuit 200.

Specifically, the display panel further includes a start signal line L0, and the start signal line L0 is connected to a start signal. The display panel is provided with a display region AA and a non-display region NAA. The pixel circuit 100 is located in the display region AA while the first shift register circuit 200, the start signal line L0, the first clock signal line L1 and the second clock signal line L2 are located in the non-display region NAA.

The first shift register circuit 200 further includes a first level signal terminal VGL and a second level signal terminal VGH, and one of the first level signal terminal VGL and the second level signal terminal VGH is connected to a high-level signal while the other of the first level signal terminal VGL and the second level signal terminal VGH is connected to a low-level signal. The first shift register circuit 200 can transmit a signal of the second level signal terminal VGH and/or the second clock signal terminal CLK2 to the output terminal OUT in response to signals of the start signal terminal IN, the first clock signal terminal CLK1, the second clock signal terminal CLK2, the first level signal terminal VGL and the second level signal terminal VGH of the first shift register circuit 200 to delay the timing of a conduction voltage level in a signal connected to the start signal terminal IN so as to obtain the second scan signal S2. The start signal terminal IN of the first first shift register circuit 200 may be connected to the start signal line L0 to access a start signal, and the start signal terminal IN of the next first shift register circuit 200 is connected to the output terminal OUT of the previous first shift register circuit 200 so that the second scan signal S2 output by the previous first shift register circuit 200 can serve as the start signal of the next first shift register circuit 200, and the multiple first shift register circuits 200 can output the second scan signals S2 having successively delayed timings, stage by stage.

Optionally, in an embodiment, the first shift register circuit 200 includes an eighth transistor T8 to the fifteenth transistor T15, a first capacitor C1 and a second capacitor C2. The first shift register circuit 200 can transmit a signal of the second clock signal terminal CLK2 to the output terminal OUT through the fourteenth transistor T14 in response to a signal of the gate of the fourteenth transistor T14 and can transmit the second level signal terminal VGH to the output terminal OUT through the fifteenth transistor T15 in response to the signal of the gate of the fifteenth transistor T15 to output the second scan signal S2 through the output terminal OUT, and the continuous duration of the conduction voltage level in the second scan signal S2 is equal to the continuous duration of a conduction voltage level in the second clock signal terminal CLK2.

In conjunction with FIGS. 9, 10 and 12, further, the display panel further includes multiple second shift register circuits 300 cascaded, the multiple second shift register circuits 300 generate first scan signals S1 having successively backward timings, stage by stage, each second shift register circuit 300 is connected to the control terminals of the threshold compensation modules 30 in the at least two rows of pixel circuits, and different second shift register circuits 300 are connected to different rows of pixel circuits.

Accordingly, that the threshold compensation modules 40 in the at least two rows of pixel circuits are controlled to be simultaneously turned on includes that first scan signals S1 are supplied to the control terminals of the threshold compensation modules 40 in at least two corresponding rows of pixel circuits 100 through the same one second shift register circuit 300.

Specifically, the each second shift register circuit 300 is located in the non-display region NAA, includes an input terminal O1 and an output terminal O2, and can delay the timing of a conduction voltage level in a signal connected to the input terminal O1 to obtain a first scan signal S1. The input terminal O1 of the first second shift register circuit 300 is connected to a start signal, the input terminal O1 of the next second shift register circuit 300 is connected to the output terminal O2 of the previous second shift register circuit 300, and a first scan signal S1 output by the previous second shift register circuit 300 serves as an input signal of the next second shift register circuit 300 so that the multiple second shift register circuits 300 can output the first scan signals S1 having successively delayed timings, stage by stage. The second shift register circuit 300 and the first shift register circuit 200 may have the same or different specific structures. The second shift register circuit 300 has a similar working principle to the first shift register circuit 200. Details are not repeated herein. The first scan signals S1 are supplied to the control terminals of the threshold compensation modules 40 in the at least two rows of pixel circuits 100 through the same one second shift register circuit 300 so that the number of the second shift register circuits 300 in the display panel can be reduced, and the design of the narrow bezel can be implemented.

FIG. 12 illustratively shows the connection modes between the multiple first shift register circuits 200 and the first clock signal line L1 and the second clock signal line L2, and the connection modes between the second shift register circuits 300 and the pixel circuit 100 when k=1. The first clock signal CK1 connected to the first clock signal line L1 and the second clock signal CK2 connected to the second clock signal line L2 may be referred to FIG. 10. In conjunction with FIGS. 9, 10, 12 and 13, an illustration is made using an example in which k=1.

The first clock signal terminal CLK1 of the first first shift register circuit 200 is connected to the first clock signal line L1, and the second clock signal terminal CLK2 of the first first shift register circuit 200 is connected to the second clock signal line L2. The first clock signal terminal CLK1 of the second first shift register circuit 200 is connected to the second clock signal line L2, and the second clock signal terminal CLK2 of the second first shift register circuit 200 is connected to the first clock signal line L1. The first clock signal terminal CLK1 of the third first shift register circuit 200 is connected to the first clock signal line L1, and the second clock signal terminal CLK2 of the third first shift register circuit 200 is connected to the second clock signal line L2. The first clock signal terminal CLK1 of the fourth first shift register circuit 200 is connected to the second clock signal line L2, and the second clock signal terminal CLK2 of the fourth first shift register circuit 200 is connected to the first clock signal line L1. In this way, the first clock signal terminals CLK1 of the odd-stage first shift register circuits 200 are connected to the first clock signal line L1, and the second clock signal terminals CLK2 of the odd-stage first shift register circuits 200 are connected to the second clock signal line L2, the first clock signal terminals CLK1 of the even-stage first shift register circuits 200 are connected to the second clock signal line L2, and the second clock signal terminals CLK2 of the even-stage first shift register circuits 200 are connected to the first clock signal line L1. That is, the first clock signal terminal CLK1 of the n−1th first shift register circuit 200 is connected to the first clock signal line L1, the second clock signal terminal CLK2 of the n−1th first shift register circuit 200 is connected to the second clock signal line L2, the first clock signal terminal CLK1 of the nth first shift register circuit 200 is connected to the second clock signal line L2, and the second clock signal terminal CLK2 of the nth first shift register circuit 200 is connected to the first clock signal line L1, where $1 \le n \le m$, m is the total number of rows of pixel circuits, and n and m are each an even number. In this way, the continuous duration of the conduction voltage level in the second scan signal S2($n$−1) output by the n−1th first shift register circuit 200 can be a, and the continuous duration of the conduction voltage level in the second scan signal S2($n$) output by the nth first shift register circuit 200 can be b, and a<b.

The output terminal O2 of the first second shift register circuit 300 is connected to the control terminals of data write modules 30 in the first row and the second row of pixel circuits, the output terminal O2 of the second second shift register circuit 300 is connected to the control terminals of data write modules 30 in the third row and the fourth row of pixel circuits, and so on, and the output terminal O2 of the n/2th second shift register circuit 300 is connected to the control terminals of the data write modules 30 in the n−1th row and the nth row of pixel circuits.

Within the display frame F, the first scan signals S1 are supplied to the control terminals of the threshold compensation modules 40 in the n−1th row and the nth row of pixel circuits through the n/2 second shift register circuit 300.

Meanwhile, the second scan signal S2($n$−1) is first supplied to the control terminals of the data write modules 30 in the n−1th row of pixel circuits through the n−1th first shift register circuit 200, and then the second scan signal S2($n$) is supplied to the control terminals of the data write modules 30 in the nth row of pixel circuits through the nth first shift register circuit 200 to enable the threshold compensation modules 40 in the n−1th row and the nth row of pixel circuits to be turned on in response to the high levels in the first scan signals S1. Meanwhile, the data write modules 30 in the n−1th row of pixel circuits are turned on in response to the low level in the second scan signal S2($n$−1), the data write modules 30 in the nth row of pixel circuits are turned on in response to the low level in the second scan signal S2($n$), the data write modules 30 in the n−1th row of pixel circuits are turned on earlier than the data write modules 30 in the nth row of pixel circuits, and the conduction duration of the data write modules 30 in the n−1th row of pixel circuits is less than the conduction duration of the data write modules 30 in the nth row of pixel circuits to reduce the difference between the actual durations of the threshold voltage compensations for the n−1th row and the nth row of pixel circuits 100 so that the degrees of the threshold voltage compensations for the n−1th row and the nth row of pixel circuits 100 can be close, and thereby the brightness difference between the light emission modules 20 driven by the n−1th row and the nth row of pixel circuits 100.

Optionally, the difference between the continuous duration a of the conduction voltage level in the first clock signal CK1 and the continuous duration b of the conduction voltage level in the second clock signal CK2 is the preset difference Δt, that is, b−a=Δt, and the magnitude of the preset difference Δt may be understood with reference to the preceding embodiments.

Exemplarily, when the first clock signal terminal CLK1 of the n−1th first shift register circuit 200 is connected to the first clock signal line L1, and the first clock signal terminal CLK1 of the nth first shift register circuit 200 is connected to the second clock signal line L2, the difference between the continuous duration a of the conduction voltage level in the first clock signal CK1 and the continuous duration b of the conduction voltage level in the second clock signal CK2 is the preset difference Δt so that the continuous duration of the low level in the second scan signal S2($n$−1) connected to the n−1th row of pixel circuits can be a, the continuous duration of the low level in the second scan signal S2($n$) connected to the nth row of pixel circuits can be b, a<b, and b−a=Δt.

Table 1 shows the data obtained by comparative experiments based on the existing display panel and the display panel shown in FIG. 12. Exemplarily, the experimental condition of the existing display panel is as follows: in a display frame, the continuous duration c of a conduction voltage level in a second scan signal S2 connected to each row of pixel circuits 100 is equal to 12 μs, and the experimental conditions of the display panel shown in FIG. 12 are as follows: in a display frame, the continuous duration a of the conduction voltage level in the second scan signal S2($n$−1) connected to the n−1th row of pixel circuits 100 is equal to 10.5 μs, the continuous duration b of the conduction voltage level in the second scan signal S2($n$) connected to the nth row of pixel circuits 100 is equal to 13 μs, and the preset difference Δt=2.5 μs.

TABLE 1

| Display Grayscale | Brightness Difference (c = 12 μs) | Brightness Difference (a = 10.5 μs, b = 13 μs) |
|---|---|---|
| 255 | 9.0% | 0.5% |
| 180 | 9.4% | 0.7% |
| 128 | 9.8% | 0.4% |
| 64 | 10.9% | 0.0% |
| 32 | 11.8% | 0.6% |
| 16 | 12.4% | 0.1% |
| 8 | 13.7% | 0.7% |
| 4 | 18.7% | 1.4% |

In Table 1, the first column shows the display grayscales of light-emitting elements D1 driven by the multiple rows of pixel circuits 100 in the display panel, the second column shows the brightness difference between light-emitting elements driven by the odd-numbered rows of pixel circuits 100 and the even-numbered rows of pixel circuits 100 in the existing display panel, and the third column shows the brightness difference between the light-emitting elements driven by the odd-numbered rows of pixel circuits 100 and the even-numbered rows of pixel circuits 100 after the driving method according to the embodiments of the present application is used. The preceding brightness difference may be calculated as: |K2−K1|/K1, K1 denotes the brightness of the light-emitting elements driven by the odd-numbered rows of pixel circuits 100, and K2 denotes the brightness of the light-emitting elements driven by the even-numbered rows of pixel circuits 100.

As seen from the data in Table 1, in the existing display panel, under different display grayscales, the brightness differences of the light-emitting elements driven by the odd-numbered rows and the even-numbered rows of pixel circuits 100 are relatively large, which makes bright and dark stripes spaced from each other appear in the display pictures. Compared with the related art, in the technical solution of this embodiment of the present disclosure, the brightness differences between the light-emitting elements driven by the odd-numbered rows and the even-numbered rows of pixel circuits 100 are relatively small, and the display pictures are normal.

Based on the same inventive concept, embodiments of the present disclosure further provide a display panel. The display panel may be driven using the method for driving a display panel according to any preceding embodiment. The display panel includes multiple rows of pixel circuits. A pixel circuit includes a drive module, a light emission module, a data write module and a threshold compensation module.

The drive module is configured to drive the light emission module to emit light according to the voltage of the control terminal of the drive module.

The data write module is connected between a data voltage terminal and the first terminal of the drive module and is configured to write a data voltage into the drive module.

The threshold compensation module is connected between the second terminal of the drive module and the control terminal of the drive module and is configured to compensate for the threshold voltage of the drive module.

In the technical solution of this embodiment of the present disclosure, within the display frame, the threshold compensation modules in the at least two rows of pixel circuits are controlled to be simultaneously turned on, and when the threshold compensation modules in the at least two rows of pixel circuits are turned on, the data write modules in the at least two rows of pixel circuits are controlled to be successively turned on, and the conduction duration of the data write modules in the previous row of pixel circuits is controlled to be less than the conduction duration of the data write modules in the next row of pixel circuits. On one hand, the threshold compensation modules in the at least two rows of pixel circuits can be driven by the same one shift register circuit to reduce the number of shift register circuits in the display panel so that the design of the narrow bezel can be implemented, and on the other hand, the duration differences of the threshold voltage compensations for the multiple rows of pixel circuits can be reduced to balance the degrees of the threshold voltage compensations for the multiple rows of pixel circuits so that the brightness differences of the light emission modules driven by the multiple rows of pixel circuits can be reduced, and thereby the brightness uniformity of the display panel can be improved.

Optionally, the control terminal of the threshold compensation module inputs a first scan signal, and the control terminal of the data write module inputs a second scan signal.

In at least two rows of pixel circuits, the same one first scan signal is input into the at least two rows of pixel circuits, the preset time interval is the time interval of a conduction voltage level in the first scan signal input into the at least two rows of pixel circuits, the time intervals of conduction voltage level in second scan signals input into the at least two rows of pixel circuits are each located within the preset time interval, the timing of a conduction voltage level in a second scan signal input into the previous row of pixel circuits is earlier than the timing of ta conduction voltage level in a second scan signal input into the next row of pixel circuits, and the continuous duration of the conduction voltage level in the second scan signal input into the previous row of pixel circuits is shorter than the continuous duration of the conduction voltage level in the second scan signal input into the next row of pixel circuits.

Optionally, the drive module includes a drive transistor, the data write module includes a first transistor, and the threshold compensation module includes a second transistor.

The gate of the first transistor is configured to input the second scan signal, the first transistor is connected between the data voltage terminal and the first electrode of the drive transistor, the gate of the second transistor is configured to input the first scan signal, and the second transistor is connected between the second electrode of the drive transistor and the gate of the drive transistor.

Optionally, the display panel further includes multiple first shift register circuits cascaded, the multiple first shift register circuits generate second scan signals having successively backward timings, stage by stage, and the ith first shift register circuit is connected to the control terminals of data write modules in the ith row of pixel circuits to supply a second scan signal to the control terminals of the data write modules in the ith row of pixel circuits, where $1 \le i \le m$, and m is the total number of rows of pixel circuits.

Optionally, the display panel further includes a first clock signal line and a second clock signal line, the first clock signal line transmits a first clock signal, and the second clock signal line transmits a second clock signal.

A first shift register circuit includes a start signal terminal, a first clock signal terminal, a second clock signal terminal and an output terminal, the start signal terminal of the first first shift register circuit is connected to a start signal, and the start signal terminal of the next first shift register circuit is connected to the output terminal of the previous first shift register circuit.

When the at least two rows of pixel circuits are the jth row and the (j+k)th row of pixel circuits, the first clock signal terminal of the jth first shift register circuit is connected to the first clock signal line, the second clock signal terminal of the jth first shift register circuit is connected to the second clock signal line, the first clock signal terminal of the (j+k)th first shift register circuit is connected to the second clock signal line, and the second clock signal terminal of the (j+k)th first shift register circuit is connected to the first clock signal line, where $j \ge 1$, $k \ge 1$, $j+k \le m$, and j and k are each an integer.

The continuous duration of a conduction voltage level in the second clock signal is less than the continuous duration of a conduction voltage level in the first clock signal.

Optionally, the display panel further includes multiple second shift register circuits cascaded, the multiple second shift register circuits generate first scan signals having successively backward timings, stage by stage, and each second shift register circuit is connected to the control terminals of the threshold compensation modules in the at least two rows of pixel circuits to supply a first scan signal to the control terminals of the threshold compensation modules in the at least two rows of pixel circuits, and different second shift register circuits are connected to different rows of pixel circuits.

It is to be noted that the specific structure of the display panel according to this embodiment of the present disclosure includes the display panel structure involved in the method for driving a display panel in the preceding embodiments. The relevant repeated content is not described.

Figure 14:
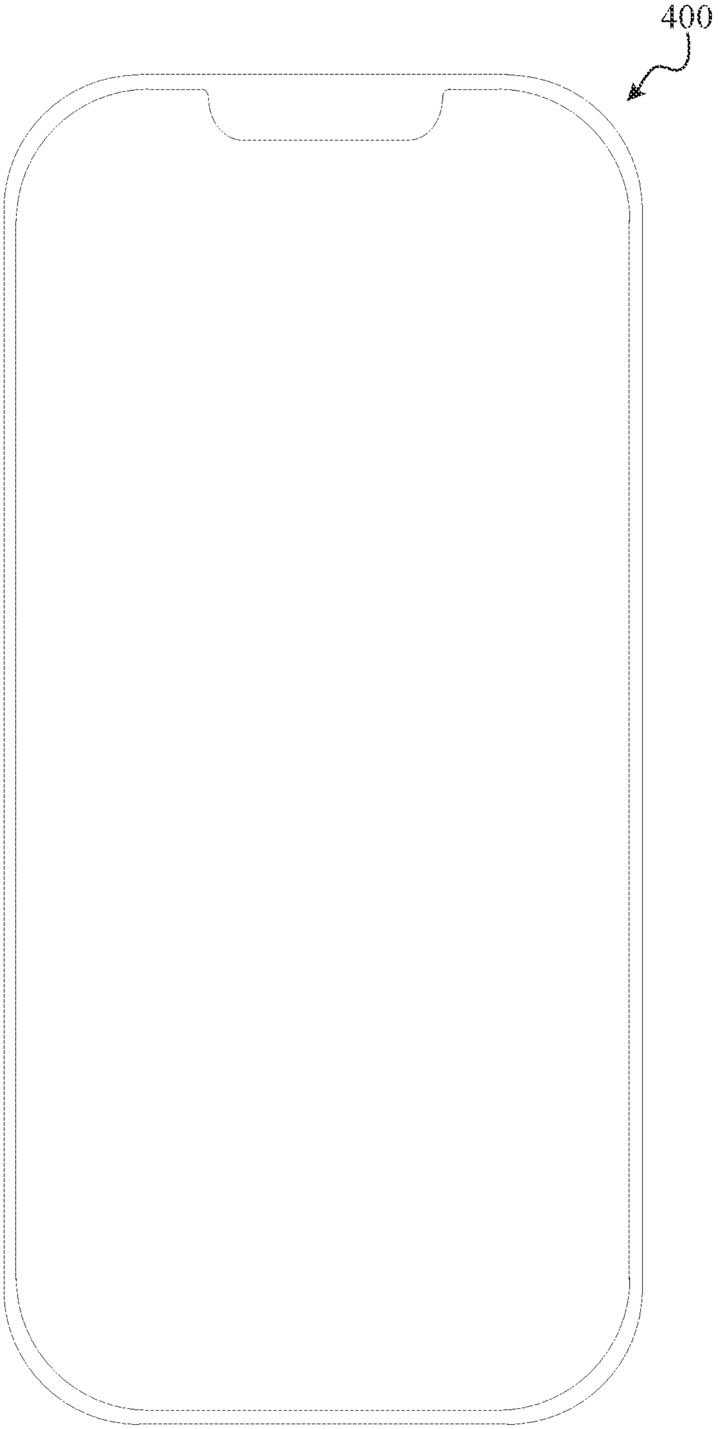
FIG. 14 is a diagram illustrating the structure of a display device according to embodiments of the present disclosure.

Based on the same inventive concept, embodiments of the present disclosure further provide a display device including the display panel in any preceding embodiment. Therefore, the display device has the corresponding functional structures and beneficial effects in the display panel. The details are not repeated here. FIG. 14 is a diagram illustrating the structure of a display device according to embodiments of the present disclosure. Referring to FIG. 14, the display device 400 may be a mobile phone or any electronic product having a display function, including, but not limited to, a television, a laptop, a desktop display, a tablet computer, a digital camera, a smart bracelet, smart glasses, an in-vehicle display, medical equipment, industrial control equipment, and a touch interactive terminal. No special limitations are made thereto in the embodiments of the present disclosure.

It is to be understood that various forms of processes shown in the preceding may be adopted with steps reordered, added, or deleted. For example, the steps described in the present disclosure may be performed in parallel, sequentially, or in different orders, as long as the desired results of the technical solutions of the present disclosure can be achieved, and no limitation is imposed herein.

The preceding embodiments do not limit the scope of the present disclosure. It is to be understood by those skilled in the art that various modifications, combinations, sub-combinations and substitutions may be performed according to design requirements and other factors. Any modification, equivalent substitution, improvement, or the like made within the spirit and principle of the present disclosure is within the scope of the present disclosure.

What is claimed is:

1. A method for driving a display panel, wherein the display panel comprises a plurality of rows of pixel circuits, and a pixel circuit of the plurality of rows of pixel circuits comprises a drive module, a light emission module, a data write module and a threshold compensation module, wherein the drive module is configured to drive the light emission module to emit light, the data write module is connected between a data voltage terminal and a first terminal of the drive module and is configured to write a data voltage into the drive module, and the threshold compensation module is connected between a second terminal of the drive module and a control terminal of the drive module and is configured to compensate for a threshold voltage of the drive module; and the method for driving a display panel comprises:

within a display frame, controlling threshold compensation modules in at least two rows of pixel circuits of the plurality of rows of pixel circuits to be in a conduction state within a preset time interval; and within the preset time interval, controlling data write modules in the at least two rows of pixel circuits to be successively turned on, and in the at least two rows of pixel circuits, controlling a conduction duration of data write modules in a previous row of pixel circuits to be less than a conduction duration of data write modules in a next row of pixel circuits.

2. The method for driving a display panel according to claim 1, wherein within the display frame, controlling the threshold compensation modules in the at least two rows of pixel circuits to be in the conduction state within the preset time interval comprises:

within the display frame, controlling threshold compensation modules in a jth row of pixel circuits and a (j+k)th row of pixel circuits to be in the conduction state within the preset time interval; and within the preset time interval, controlling the data write modules in the at least two rows of pixel circuits to be successively turned on, and in the at least two rows of pixel circuits, controlling the conduction duration of the data write modules in the previous row of pixel circuits to be less than the conduction duration of the data write modules in the next row of pixel circuits comprises:

within the preset time interval, controlling data write modules in the jth row of pixel circuits to be turned on earlier than data write modules in the (j+k)th row of pixel circuits, and controlling a conduction duration of the data write modules in the jth row of pixel circuits to be less than a conduction duration of the data write modules in the (j+k)th row of pixel circuits, wherein $j \geq 1$, $k \geq 1$, $j+k \leq m$, m is a total number of rows of pixel circuits, and j, k and m are each an integer.

3. The method for driving a display plane according to claim 1, wherein a control terminal of the threshold compensation module is configured to input a first scan signal, and a control terminal of the data write module is configured to input a second scan signal;

controlling the threshold compensation modules in the at least two rows of pixel circuits to be in the conduction state within the preset time interval comprises: supplying first scan signals to control terminals of the threshold compensation modules in the at least two rows of pixel circuits; and controlling the data write modules in the at least two rows of pixel circuits to be successively turned on comprises: supplying second scan signals to control terminals of the data write modules in the at least two rows of pixel circuits, wherein in the at least two rows of pixel circuits, a same one first scan signal is input into the at least two rows of pixel circuits, the preset time interval is a time interval of a conduction voltage level in the first scan signal input into the at least two rows of pixel circuits, time intervals of the conduction voltage level in second scan signals input into the at least two rows of pixel circuits are each located within the preset time interval, a timing of a conduction voltage level in a second scan signal input into the previous row of pixel circuits is earlier than a timing of a conduction voltage level in a second scan signal input into the next row of pixel circuits, and a continuous duration of the conduction voltage level in the second scan signal input into the previous row of pixel circuits is shorter than a continuous duration of the conduction voltage level in the second scan signal input into the next row of pixel circuits.

4. The method for driving a display panel according to claim 3, wherein the drive module comprises a drive transistor, the data write module comprises a first transistor, and the threshold compensation module comprises a second transistor;

a gate of the first transistor is configured to input the second scan signal, the first transistor is connected between the data voltage terminal and a first electrode of the drive transistor, a gate of the second transistor is configured to input the first scan signal, and the second transistor is connected between a second electrode of the drive transistor and a gate of the drive transistor;

supplying the first scan signals to the control terminals of the threshold compensation modules in the at least two rows of pixel circuits comprises: supplying the first scan signal to gates of second transistors in the at least two rows of pixel circuits; and supplying the second scan signals to the control terminals of the data write modules in the at least two rows of pixel circuits comprises: supplying the second scan signals to gates of first transistors in the at least two rows of pixel circuits.

5. The method for driving a display panel according to claim 3, wherein in the at least two rows of pixel circuits, a difference between the continuous duration of the conduction voltage level in the second scan signal input into the previous row of pixel circuits and the continuous duration of the conduction voltage level in the second scan signal input into the next row of pixel circuits is a preset difference, and a magnitude of the preset difference is correlated to a magnitude of a first value, a magnitude of a second value and a magnitude of a third value, wherein the first value is the continuous duration of the conduction voltage level in the second scan signal input into the next row of pixel circuits, the second value is a duration from an end of the conduction voltage level in the second scan signal input into the next row of pixel circuits to an end of a conduction voltage level in the first scan signal input into the at least two rows of pixel circuits, and the third value is a duration from an end of the conduction voltage level in the second scan signal input into the previous row of pixel circuits to the end of the conduction voltage level in the second scan signal input into the next row of pixel circuits.

6. The method for driving a display panel according to claim 5, wherein the magnitude of the preset difference is positively correlated to the magnitude of the first value.

7. The method for driving a display panel according to claim 5, wherein the magnitude of the preset difference is negatively correlated to the magnitude of the second value.

8. The method for driving a display panel according to claim 5, wherein the magnitude of the preset difference is positively correlated to the magnitude of the third value.

9. The method for driving a display panel according to claim 5, wherein the preset difference ranges from H/25 to H/5, wherein H is the third value.

10. The method for driving a display panel according to claim 1, wherein the display panel further comprises a plurality of first shift register circuits cascaded, the plurality of first shift register circuits generate second scan signals having successively backward timings, stage by stage, an ith first shift register circuit is connected to control terminals of data write modules in an ith row of pixel circuits to supply a second scan signal to the control terminals of the data write modules in the ith row of pixel circuits, wherein 1≤i≤m, and m is the total number of rows of pixel circuits; and controlling the data write modules in the at least two rows of pixel circuits to be turned on successively comprises:

supplying the second scan signals to the control terminals of the data write modules in the at least two rows of pixel circuits through corresponding first shift register circuits.

11. The method for driving a display panel according to claim 10, wherein the display panel further comprises a first clock signal line and a second clock signal line, the first clock signal line transmits a first clock signal, and the second clock signal line transmits a second clock signal;

a first shift register circuit of the plurality of first shift register circuits comprises a start signal terminal, a first clock signal terminal, a second clock signal terminal and an output terminal, a start signal terminal of a first first shift register circuit is connected to a start signal, and a start signal terminal of a next first shift register circuit is connected to an output terminal of a previous first shift register circuit;

when the at least two rows of pixel circuits are the jth row of pixel circuits and the (j+k)th row of pixel circuits, a first clock signal terminal of a jth first shift register circuit is connected to the first clock signal line, a second clock signal terminal of the jth first shift register circuit is connected to the second clock signal line, a first clock signal terminal of a (j+k)th first shift register circuit is connected to the second clock signal line, and a second clock signal terminal of the (j+k)th first shift register circuit is connected to the first clock signal line, wherein j≥1, k≥1, j+k≤m, j and k are each an integer, wherein a continuous duration of a conduction voltage level in the second clock signal is less than a continuous duration of a conduction voltage level in the first clock signal; and supplying the second scan signals to the control terminals of the data write modules in the at least two rows of pixel circuits through the corresponding first shift register circuits comprises:

supplying a second scan signal to control terminals of the data write modules in the jth row of pixel circuits through the jth first shift register circuit; and supplying a second scan signal to control terminals of the data write modules in the (j+k)th row of pixel circuits through the (j+k)th first shift register circuit.

12. The method for driving a display panel according to claim 11, wherein a difference between the continuous duration of the conduction voltage level in the first clock signal and the continuous duration of the conduction voltage level in the second clock signal is the preset difference.

13. The method for driving a display panel according to claim 1, wherein the display panel further comprises a plurality of second shift register circuits cascaded, the plurality of second shift register circuits generate first scan signals having successively backward timings, stage by stage, each of the plurality of second shift register circuits is connected to control terminals of the threshold compensation modules in the at least two rows of pixel circuits, and different second shift register circuits are connected to different rows of pixel circuits; and controlling the threshold compensation modules in the at least two rows of pixel circuits to be in the conduction state within the preset time interval comprises:

supplying first scan signals to control terminals of threshold compensation modules in at least two corresponding rows of pixel circuits through a same one second shift register circuit.

14. A display panel, comprising a plurality of rows of pixel circuits, and a pixel circuit of the plurality of rows of pixel circuits comprises:

a drive module and a light emission module, wherein the drive module is configured to drive the light emission module to emit light according to a voltage of a control terminal of the drive module;

a data write module, wherein the data write module is connected between a data voltage terminal and a first terminal of the drive module and is configured to write a data voltage into the drive module; and a threshold compensation module, wherein the threshold compensation module is connected between a second terminal of the drive module and the control terminal of the drive module and is configured to compensate for a threshold voltage of the drive module;

wherein the display panel is driven by a method for driving a display panel, and the method comprises:

within a display frame, controlling threshold compensation modules in at least two rows of pixel circuits of the plurality of rows of pixel circuits to be in a conduction state within a preset time interval; and within the preset time interval, controlling data write modules in the at least two rows of pixel circuits to be successively turned on, and in the at least two rows of pixel circuits, controlling a conduction duration of data write modules in a previous row of pixel circuits to be less than a conduction duration of data write modules in a next row of pixel circuits.

15. The display plane according to claim 14, wherein a control terminal of the threshold compensation module inputs a first scan signal, and a control terminal of the data write module inputs a second scan signal;

wherein in at least two rows of pixel circuits of the plurality of rows of pixel circuits, a same one first scan signal is input into the at least two rows of pixel circuits, the preset time interval is a time interval of a conduction voltage level in the first scan signal input into the at least two rows of pixel circuits, time intervals of conduction voltage level in second scan signals input into the at least two rows of pixel circuits are each located within the preset time interval, a timing of a conduction voltage level in a second scan signal input into a previous row of pixel circuits is earlier than a timing of a conduction voltage level in a second scan signal input into a next row of pixel circuits, and a continuous duration of the conduction voltage level in the second scan signal input into the previous row of pixel circuits is shorter than a continuous duration of the conduction voltage level in the second scan signal input into the next row of pixel circuits.

16. The display panel according to claim 15, wherein the drive module comprises a drive transistor, the data write module comprises a first transistor, and the threshold compensation module comprises a second transistor, a gate of the first transistor is configured to input the second scan signal, the first transistor is connected between the data voltage terminal and a first electrode of the drive transistor, a gate of the second transistor is configured to input the first scan signal, and the second transistor is connected between a second electrode of the drive transistor and a gate of the drive transistor.

17. The display panel according to claim 14, wherein the display panel further comprises a plurality of first shift register circuits cascaded, the plurality of first shift register circuits generate second scan signals having successively backward timings, stage by stage, an ith first shift register circuit is connected to control terminals of data write modules in an ith row of pixel circuits to supply a second scan signal to the control terminals of the data write modules in the ith row of pixel circuits, wherein 1≤i≤m, and m is a total number of rows of pixel circuits.

18. The display panel according to claim 17, wherein the display panel further comprises a first clock signal line and a second clock signal line, the first clock signal line transmits a first clock signal, and the second clock signal line transmits a second clock signal;

a first shift register circuit of the plurality of first shift register circuits comprises a start signal terminal, a first clock signal terminal, a second clock signal terminal and an output terminal, a start signal terminal of a first first shift register circuit is connected to a start signal, and a start signal terminal of a next first shift register circuit is connected to an output terminal of a previous first shift register circuit; and when the at least two rows of pixel circuits are a jth row of pixel circuits and a (j+k)th row of pixel circuits, a first clock signal terminal of a jth first shift register circuit is connected to the first clock signal line, a second clock signal terminal of the jth first shift register circuit is connected to the second clock signal line, a first clock signal terminal of a (j+k)th first shift register circuit is connected to the second clock signal line, and a second clock signal terminal of the (j+k)th first shift register circuit is connected to the first clock signal line, wherein j≥1, k≥1, j+k≤m, j and k are each an integer, wherein a continuous duration of a conduction voltage level in the second clock signal is less than a continuous duration of a conduction voltage level in the first clock signal.

19. The display panel according to claim 17, wherein the display panel further comprises a plurality of second shift register circuits cascaded, the plurality of second shift register circuits generate first scan signals having successively backward timings, stage by stage, each of the plurality of second shift register circuits is connected to control terminals of threshold compensation modules in the at least two rows of pixel circuits to supply first scan signals to the control terminals of the threshold compensation modules in the at least two rows of pixel circuits, and different second shift register circuits are connected to different rows of the plurality of rows of pixel circuits.

20. A display device, comprising a display panel, wherein the display panel comprises a plurality of rows of pixel circuits, and a pixel circuit of the plurality of rows of pixel circuits comprises:

a drive module and a light emission module, wherein the drive module is configured to drive the light emission module to emit light according to a voltage of a control terminal of the drive module;

a data write module, wherein the data write module is connected between a data voltage terminal and a first terminal of the drive module and is configured to write a data voltage into the drive module; and a threshold compensation module, wherein the threshold compensation module is connected between a second terminal of the drive module and the control terminal of the drive module and is configured to compensate for a threshold voltage of the drive module;

wherein the display panel is driven by a method for driving a display panel, and the method comprises:

within a display frame, controlling threshold compensation modules in at least two rows of pixel circuits of the plurality of rows of pixel circuits to be in a conduction state within a preset time interval; and within the preset time interval, controlling data write modules in the at least two rows of pixel circuits to be successively turned on, and in the at least two rows of pixel circuits, controlling a conduction duration of data write modules in a previous row of pixel circuits to be less than a conduction duration of data write modules in a next row of pixel circuits.

* * * * *